(12) United States Patent
Zhang

(10) Patent No.: US 10,386,691 B2
(45) Date of Patent: Aug. 20, 2019

(54) METHOD AND APPARATUS FOR A DRY PARTICLE TOTALLY INTERNALLY REFLECTIVE IMAGE DISPLAY

(71) Applicant: CLEARink Displays, Inc., Santa Clara, CA (US)

(72) Inventor: Xiaojia Zhang, Fremont, CA (US)

(73) Assignee: CLEARink Display, Inc., Fremont, CA (US)

( * ) Notice: Subject to any disclaimer, the term of this patent is extended or adjusted under 35 U.S.C. 154(b) by 121 days.

(21) Appl. No.: 15/190,420

(22) Filed: Jun. 23, 2016

(65) Prior Publication Data

US 2016/0377950 A1 Dec. 29, 2016

Related U.S. Application Data

(60) Provisional application No. 62/184,186, filed on Jun. 24, 2015.

(51) Int. Cl.
*G02F 1/01* (2006.01)
*G09G 3/34* (2006.01)
(Continued)

(52) U.S. Cl.
CPC ............ *G02F 1/167* (2013.01); *G02F 1/0121* (2013.01); *G09G 3/344* (2013.01); *G02F 1/0123* (2013.01);
(Continued)

(58) Field of Classification Search
CPC ...... G02F 1/0121; G02F 1/0123; G02F 1/167; G02F 2001/1674; G02F 2001/1676;
(Continued)

(56) References Cited

U.S. PATENT DOCUMENTS 3,792,308 A 2/1974 Ota et al.
3,919,031 A 11/1975 White
(Continued)

FOREIGN PATENT DOCUMENTS

AT 333109 T 8/2006
CA 2292441 C 7/2002
(Continued)

OTHER PUBLICATIONS

Mossman, M. A. et al., "A Novel Reflective Image Display Using Total Internal Reflection" Displays Devices, Dempa Publications, Tokyo JP vol. 25, No. 5 Dec. 1, 2004 pp. 215-221.
(Continued)

*Primary Examiner* — Loha Ben
(74) *Attorney, Agent, or Firm* — Dianoosh Salehi

(57) ABSTRACT

A total internal reflection image display comprised of dry electrostatically mobile particles composed of a solid material stably floating as a dispersant in a gas and exhibiting a high fluidity in an aerosol state may be sealed between the transparent sheet capable of total internal reflection such as comprising a plurality of transparent convex or hemi-spherical protrusions and the rear support, partition walls and the dry particles may be moved by application of a voltage bias. A method of manufacture is described comprising of the steps of forming partition walls, filling with dry particles, sealing the particles into cells or compartments.

29 Claims, 12 Drawing Sheets

(51) Int. Cl.
*G02F 1/167* (2019.01)
*G02F 1/1335* (2006.01)
*G02F 1/1671* (2019.01)
*G02F 1/1679* (2019.01)
*G02F 1/1681* (2019.01)

(52) U.S. Cl.
CPC ...... *G02F 1/133526* (2013.01); *G02F 1/1671* (2019.01); *G02F 1/1679* (2019.01); *G02F 1/1681* (2019.01); *G02F 2203/023* (2013.01); *G09G 3/34* (2013.01); *G09G 3/3433* (2013.01)

(58) Field of Classification Search
CPC ....... G02F 2001/1678; G02F 2202/022; G02F 1/133526; G02F 1/1671; G02F 1/1673; G02F 1/1677; G02F 1/1679; G02F 1/1681; G02F 1/1685; G02F 1/2001; G02F 1/1674; G02F 1/1676; G02F 1/1678; G02F 2203/023; G09G 3/34; G09G 3/3433; G09G 3/344; G09G 2320/02; G09G 2320/068; G09G 3/3453; G02B 26/00; G02B 5/128
USPC .............................. 359/296, 222.1; 345/107
See application file for complete search history.

(56) References Cited

U.S. PATENT DOCUMENTS

| | | | |
|---|---|---|---|
| 4,025,674 A | 5/1977 | Mizuochi | |
| 4,071,430 A | 1/1978 | Liebert | |
| 4,203,106 A | 5/1980 | Dalisa et al. | |
| 4,648,956 A | 3/1987 | Marhsall et al. | |
| 4,821,092 A | 4/1989 | Noguchi | |
| 5,019,748 A | 5/1991 | Appelberg | |
| 5,319,491 A | 6/1994 | Selbrede | |
| 5,359,346 A | 10/1994 | DiSanto | |
| 5,396,350 A | 3/1995 | Beeson et al. | |
| 5,596,671 A | 1/1997 | Rockwell, III | |
| 5,717,283 A | 2/1998 | Biegelsen et al. | |
| 5,871,653 A | 2/1999 | Ling | |
| 5,959,777 A | 9/1999 | Whitehead | |
| 5,999,307 A | 12/1999 | Whitehead et al. | |
| 6,064,784 A | 5/2000 | Whitehead et al. | |
| 6,215,920 B1 | 4/2001 | Whitehead et al. | |
| 6,304,365 B1 | 10/2001 | Whitehead et al. | |
| 6,376,828 B1 | 4/2002 | Barrett | |
| 6,377,383 B1 | 4/2002 | Whitehead et al. | |
| 6,384,979 B1 | 5/2002 | Whitehead et al. | |
| 6,437,921 B1 | 8/2002 | Whitehead | |
| 6,452,734 B1 | 9/2002 | Whitehead et al. | |
| 6,532,048 B1 | 3/2003 | Matsui | |
| 6,574,025 B2 | 6/2003 | Whitehead et al. | |
| 6,751,008 B2 | 6/2004 | Liang et al. | |
| 6,787,976 B2 | 9/2004 | Minoura et al. | |
| 6,822,783 B2 | 11/2004 | Matsuda et al. | |
| 6,842,279 B2 | 1/2005 | Amundson | |
| 6,863,414 B2 | 3/2005 | Ho | |
| 6,865,011 B2* | 3/2005 | Whitehead | G02F 1/167 359/222.1 |
| 6,885,496 B2 | 4/2005 | Whitehead et al. | |
| 6,891,658 B2* | 5/2005 | Whitehead | G02B 5/128 359/222.1 |
| 6,975,455 B1 | 12/2005 | Kotchick et al. | |
| 7,046,439 B2 | 5/2006 | Kaminsky et al. | |
| 7,093,968 B2 | 8/2006 | Hsueh et al. | |
| 7,164,536 B2 | 1/2007 | Whitehead | |
| 7,170,670 B2 | 1/2007 | Webber | |
| 7,259,744 B2 | 8/2007 | Arango et al. | |
| 7,286,280 B2* | 10/2007 | Whitehead | G02B 3/0043 359/296 |
| 7,324,263 B2 | 1/2008 | Johnson et al. | |
| 7,422,964 B2 | 9/2008 | Akiyama | |
| 7,439,948 B2 | 10/2008 | Johnson et al. | |
| 7,454,103 B2 | 11/2008 | Parriaux | |
| 7,463,398 B2 | 12/2008 | Feenstra | |
| 7,507,012 B2 | 3/2009 | Aylward et al. | |
| 7,515,326 B2 | 4/2009 | Ibrede et al. | |
| 7,564,614 B2 | 7/2009 | Chen et al. | |
| 7,660,509 B2 | 2/2010 | Bryan et al. | |
| 7,740,387 B2 | 6/2010 | Schultz et al. | |
| 7,760,417 B2 | 7/2010 | Whitehead | |
| 7,775,700 B2 | 8/2010 | Lee | |
| 7,852,430 B1 | 12/2010 | Gettmey | |
| 7,940,457 B2 | 5/2011 | Jain et al. | |
| 8,022,615 B2 | 9/2011 | Bai et al. | |
| 8,040,591 B2* | 10/2011 | Whitehead | G02F 1/167 359/290 |
| 8,094,364 B2 | 1/2012 | Park | |
| 8,179,034 B2 | 5/2012 | Potts et al. | |
| 8,384,659 B2 | 2/2013 | Yeo et al. | |
| 8,587,512 B2 | 11/2013 | Hiji et al. | |
| 8,648,772 B2 | 2/2014 | Hebenstreit et al. | |
| 8,690,408 B2 | 4/2014 | Li | |
| 9,360,696 B1 | 6/2016 | Ghali et al. | |
| 9,377,574 B2 | 6/2016 | Li | |
| 9,612,501 B2* | 4/2017 | Whitehead | G02F 1/167 |
| 9,897,890 B2* | 2/2018 | Whitehead | G02F 1/167 |
| 9,939,706 B2* | 4/2018 | Whitehead | G02F 1/167 |
| 9,939,707 B2* | 4/2018 | Loxley | G02B 5/128 |
| 2001/0004275 A1 | 6/2001 | Umemoto et al. | |
| 2002/0063963 A1 | 5/2002 | Whitehead et al. | |
| 2002/0089735 A1 | 7/2002 | Albert et al. | |
| 2002/0140884 A1 | 10/2002 | Richard | |
| 2002/0171910 A1 | 11/2002 | Pullen et al. | |
| 2003/0038755 A1 | 2/2003 | Amundson et al. | |
| 2003/0067666 A1 | 4/2003 | Kawai | |
| 2003/0165016 A1 | 9/2003 | Whitehead et al. | |
| 2003/0179327 A1 | 9/2003 | Nonaka et al. | |
| 2003/0214697 A1 | 11/2003 | Duthaler et al. | |
| 2004/0085496 A1 | 5/2004 | Paukshto et al. | |
| 2004/0136047 A1 | 7/2004 | Whitehead et al. | |
| 2004/0160551 A1 | 8/2004 | Wang et al. | |
| 2004/0174584 A1 | 9/2004 | Whitehead et al. | |
| 2004/0177237 A1 | 9/2004 | Huppenthal et al. | |
| 2004/0179145 A1 | 9/2004 | Jacobsen et al. | |
| 2004/0239613 A1 | 12/2004 | Kishi | |
| 2005/0007000 A1 | 1/2005 | Chou et al. | |
| 2005/0068287 A1 | 3/2005 | Lin et al. | |
| 2005/0270439 A1 | 12/2005 | Weber et al. | |
| 2006/0056009 A1 | 3/2006 | Kombrekke et al. | |
| 2006/0148262 A1 | 7/2006 | Lee et al. | |
| 2006/0170330 A1 | 8/2006 | Disanto et al. | |
| 2006/0209010 A1 | 9/2006 | Ding et al. | |
| 2006/0209418 A1 | 9/2006 | Whitehead | |
| 2006/0291034 A1 | 12/2006 | Patry et al. | |
| 2007/0008739 A1 | 1/2007 | Kim et al. | |
| 2007/0019434 A1 | 1/2007 | Lee | |
| 2007/0046623 A1 | 3/2007 | Song | |
| 2007/0047003 A1 | 3/2007 | Suwabe | |
| 2007/0091434 A1 | 4/2007 | Garner et al. | |
| 2007/0195231 A1 | 8/2007 | Kuribayashi et al. | |
| 2007/0195391 A1 | 9/2007 | Nishikawa et al. | |
| 2007/0247573 A1 | 10/2007 | Ouderkirk et al. | |
| 2007/0263137 A1 | 11/2007 | Shigeta et al. | |
| 2007/0263291 A1 | 11/2007 | Whitehead | |
| 2008/0002247 A1 | 1/2008 | Nagato et al. | |
| 2008/0024432 A1 | 1/2008 | Lee et al. | |
| 2008/0030661 A1 | 2/2008 | Tung et al. | |
| 2008/0043184 A1 | 2/2008 | Tung et al. | |
| 2008/0174852 A1 | 7/2008 | Hirai et al. | |
| 2008/0203910 A1 | 8/2008 | Reynolds | |
| 2008/0204854 A1 | 8/2008 | Whitehead et al. | |
| 2008/0218845 A1 | 9/2008 | Murakami | |
| 2008/0219024 A1 | 9/2008 | Mi et al. | |
| 2008/0231960 A1 | 9/2008 | Van Gorkom et al. | |
| 2008/0266245 A1 | 10/2008 | Wilcox | |
| 2008/0266646 A1 | 10/2008 | Wilcox et al. | |
| 2008/0285282 A1 | 11/2008 | Karman et al. | |
| 2008/0297496 A1 | 12/2008 | Watson et al. | |
| 2008/0303994 A1 | 12/2008 | Jeng et al. | |
| 2008/0304134 A1 | 12/2008 | Ban | |
| 2009/0096745 A1 | 4/2009 | Sprague et al. | |

(56) References Cited

U.S. PATENT DOCUMENTS

| | | |
|---|---|---|
| 2009/0109172 A1 | 4/2009 | Lee et al. |
| 2009/0141221 A1 | 6/2009 | Taguchi et al. |
| 2009/0201565 A1 | 8/2009 | Bita et al. |
| 2009/0201570 A1 | 8/2009 | Frazier et al. |
| 2009/0207476 A1 | 8/2009 | Yanagisawa et al. |
| 2009/0225398 A1 | 9/2009 | Duthaler et al. |
| 2009/0231714 A1 | 9/2009 | Zhao et al. |
| 2009/0244935 A1 | 10/2009 | Hsieh et al. |
| 2009/0256810 A1 | 10/2009 | Pasquariello |
| 2009/0262083 A1 | 10/2009 | Parekh |
| 2009/0262414 A1 | 10/2009 | Whitehead |
| 2009/0273746 A1 | 11/2009 | Uehara et al. |
| 2009/0322669 A1 | 12/2009 | Bryning et al. |
| 2010/0079843 A1 | 4/2010 | Derichs et al. |
| 2010/0085627 A1 | 4/2010 | Whitehead |
| 2010/0091224 A1 | 4/2010 | Cho et al. |
| 2010/0118383 A1 | 5/2010 | Van Abeelen et al. |
| 2010/0148385 A1 | 6/2010 | Balko et al. |
| 2010/0172016 A1 | 7/2010 | Park et al. |
| 2010/0225575 A1 | 9/2010 | Ishii et al. |
| 2010/0245375 A1 | 9/2010 | Rhodes |
| 2010/0253711 A1 | 10/2010 | Muroi |
| 2011/0007381 A1 | 1/2011 | Paolini, Jr. et al. |
| 2011/0032460 A1 | 2/2011 | Lee et al. |
| 2011/0043435 A1 | 2/2011 | Hebenstreit et al. |
| 2011/0051054 A1 | 3/2011 | Wang et al. |
| 2011/0085116 A1 | 4/2011 | Kim |
| 2011/0085232 A1 | 4/2011 | Werner et al. |
| 2011/0273906 A1 | 10/2011 | Nichol et al. |
| 2011/0279442 A1 | 11/2011 | Hage et al. |
| 2011/0299014 A1 | 12/2011 | Jang et al. |
| 2011/0304902 A1 | 12/2011 | Yeo et al. |
| 2011/0310465 A1 | 12/2011 | Takanashi |
| 2011/0316764 A1 | 12/2011 | Parry-Jones et al. |
| 2012/0008203 A1 | 1/2012 | Ijzerman et al. |
| 2012/0019896 A1 | 1/2012 | Yoshida et al. |
| 2012/0019899 A1 | 1/2012 | Yeo |
| 2012/0026576 A1 | 2/2012 | Bita et al. |
| 2012/0062981 A1 | 3/2012 | Komatsu et al. |
| 2012/0069064 A1 | 3/2012 | Yamakita |
| 2012/0081777 A1 | 4/2012 | Heikenfeld et al. |
| 2012/0113367 A1 | 5/2012 | Kitson et al. |
| 2012/0113499 A1 | 5/2012 | Komatsu |
| 2012/0262496 A1 | 10/2012 | Swic |
| 2012/0281430 A1 | 11/2012 | Huang et al. |
| 2012/0287380 A1 | 11/2012 | Hagiwara et al. |
| 2012/0293857 A1 | 11/2012 | Kwon et al. |
| 2013/0050806 A1 | 2/2013 | Yasui et al. |
| 2013/0077284 A1 | 3/2013 | Chang et al. |
| 2013/0135320 A1 | 5/2013 | Govil |
| 2013/0155723 A1 | 6/2013 | Coleman |
| 2013/0182311 A1 | 7/2013 | Mochizuki et al. |
| 2013/0278995 A1 | 10/2013 | Drzaic et al. |
| 2013/0334972 A1 | 12/2013 | Atkins |
| 2014/0049448 A1 | 2/2014 | Christensen |
| 2014/0063586 A1 | 3/2014 | Jung et al. |
| 2014/0160185 A1 | 6/2014 | Okuno et al. |
| 2014/0333989 A1 | 11/2014 | Whitehead |
| 2014/0340376 A1 | 11/2014 | Itagaki et al. |
| 2015/0146273 A1 | 5/2015 | Whitehead |
| 2015/0234250 A1 | 8/2015 | Lin et al. |
| 2016/0026061 A1 | 1/2016 | O'Keeffe |
| 2016/0097961 A1 | 4/2016 | Whitehead |
| 2016/0116815 A1 | 4/2016 | Whitehead |
| 2016/0139478 A1* | 5/2016 | Whitehead .............. G02F 1/167 359/222.1 |
| 2016/0147128 A1* | 5/2016 | Loxley ................... G02B 5/128 359/222.1 |
| 2016/0155399 A1 | 6/2016 | Tripathi et al. |
| 2016/0216561 A1 | 7/2016 | Lee et al. |
| 2016/0231475 A1 | 8/2016 | Whitehead |
| 2016/0246155 A1* | 8/2016 | Loxley ................... G02F 1/167 |
| 2016/0274435 A1 | 9/2016 | Whitehead |
| 2016/0349592 A1* | 12/2016 | Goulding ................ G02F 1/167 |
| 2016/0363811 A1 | 12/2016 | Zhong et al. |
| 2017/0068145 A1 | 3/2017 | Nakamura et al. |
| 2017/0075184 A1* | 3/2017 | Low ...................... G02F 1/1362 |
| 2017/0160444 A1 | 6/2017 | Sadlik |
| 2017/0160448 A1 | 6/2017 | Whitehead |
| 2017/0160620 A1 | 6/2017 | Whitehead |
| 2017/0287406 A1 | 10/2017 | Whitehead |
| 2017/0299935 A1 | 10/2017 | Whitehead |
| 2018/0017838 A1 | 1/2018 | Thomas |
| 2018/0031941 A1 | 2/2018 | Goulding |
| 2018/0157144 A1* | 6/2018 | Sadlik ................... G02F 1/195 |
| 2018/0173074 A1 | 6/2018 | Zhang |

FOREIGN PATENT DOCUMENTS

| | | |
|---|---|---|
| CA | 2371138 C | 7/2005 |
| CA | 2410955 C | 1/2007 |
| CA | 2474384 C | 8/2010 |
| CA | 2643808 C | 8/2013 |
| CN | 1308734 A | 8/2001 |
| CN | 1173208 C | 10/2004 |
| CN | 1639625 A | 7/2005 |
| CN | 101160547 A | 4/2008 |
| CN | 1454327 A | 9/2008 |
| CN | 102955318 A | 3/2013 |
| CN | 103207495 A | 7/2013 |
| CN | 108957898 A | 12/2018 |
| DE | 69825894 | 9/2005 |
| EP | 1118039 | 2/2003 |
| EP | 0988573 B1 | 8/2004 |
| EP | 1290486 B1 | 10/2004 |
| EP | 1368700 B1 | 7/2006 |
| JP | 2004085635 | 3/2004 |
| JP | 2007505330 | 3/2007 |
| JP | 3965115 | 6/2007 |
| JP | 2007279641 | 10/2007 |
| JP | 4113843 | 4/2008 |
| JP | 2009251215 | 10/2009 |
| JP | 4956610 | 3/2012 |
| JP | 2005519329 | 6/2017 |
| KR | 100949412 | 3/2010 |
| TW | 201024886 A | 7/2010 |
| WO | 2003075085 | 9/2003 |
| WO | 2005010604 | 2/2005 |
| WO | 2006108285 | 10/2006 |
| WO | 2006114743 | 11/2006 |
| WO | 2008103554 A1 | 8/2008 |
| WO | 2012021121 A1 | 2/2012 |
| WO | 2014092729 A1 | 6/2014 |
| WO | 2014146937 | 9/2014 |
| WO | 2014160552 A1 | 10/2014 |
| WO | 2014189751 A1 | 11/2014 |
| WO | 2015005899 A2 | 1/2015 |
| WO | 2015061538 A1 | 4/2015 |
| WO | 2015116913 | 8/2015 |
| WO | 2015175518 | 11/2015 |
| WO | 2016057613 A1 | 4/2016 |
| WO | 2016085835 A1 | 6/2016 |
| WO | 2016109273 A1 | 7/2016 |
| WO | 2016130720 | 8/2016 |
| WO | 2007072355 A2 | 6/2017 |
| WO | 2017100157 A1 | 6/2017 |
| WO | 2017105443 A1 | 6/2017 |
| WO | 2017147449 A1 | 8/2017 |
| WO | 2017205312 A1 | 11/2017 |
| WO | 2017214396 A1 | 12/2017 |
| WO | 2017040628 A1 | 3/2018 |

OTHER PUBLICATIONS

Gou, S. et al., "Transparent Superhydrophobic Surfaces for Applications of Controlled Reflectance" Applied Optics vol. 51, Issue No. 11, Apr. 10, 2012, pp. 1645-1653.

Whitehead, L. et al., "The Many Roles of Illumination in Information Display" Society for Information Display Symposium (Invited Paper), Issue No. 0097-966X/06/3701-0000, May 2010.

Wong, R. et al., "Electrochemical Threshold Conditions During Electro-Optical Switching of Ionic Electrophorectic Optical Devices" Applied Optics vol. 48, Issue No. 6, Feb. 20, 2009, pp. 1062-1072.

(56) References Cited

OTHER PUBLICATIONS

Whitehead, L. et al., "Reflections on Total Internal Reflection" Optics and Photonics News Feb. 2009, pp. 28-34.

Mossman, M. et al., "Observations of Total Internal Reflection at a Natural Super-Hydrophobic Surface" Physics in Canada vol. 64, Issue No. 1, Mar. 2008, pp. 7-11.

Hrudey, P. et al., "Application of Transparent Nanostructured Electrodes for Modulation of Total Internal Reflection" SPIE 2007 Conference Paper No. 6647 Aug. 2007, pp. 1-12.

Hrudey, P. et al., "Variable Diffraction Gratings Using Nanoporous Electrodes and Electrophoresis of Dye Ions" SPIE 2007 Conference Paper No. 6645 Aug. 2007, pp. 1-12.

Webster, A. et al., "Control of Reflection at an Optical Interface in the Absence of Total Internal Reflection for a Retroreflective Display Application" Applied Optics vol. 45, Issue No. 6, Feb. 20, 2006, pp. 1169-1176.

Mossman, M. et al., "Off the Beaten Path with Total Internal Reflection" International Optical Design Conference (Invited Paper), Jun. 2006, pp. 1-12.

Whitehead, L. et al., "Total Internal Reflection for Illumination and Displays" SPIE Newsroom Sep. 7-8, 2006.

Mossman, M. et al., "Controlled Frustration of TIR by Electrophoresis of Pigment Particles" Applied Optics vol. 44, Issue No. 9, Mar. 20, 2005, pp. 1601-1609.

Kwong, V. et al., "Control of Reflectance of Liquid Droplets by Means of Electrowetting" Applied Optics vol. 43, Issue No. 4, Feb. 1, 2004, pp. 808-813.

Mossman, M. et al. "A High Reflectance, Wide Viewing Angle Reflective Display Using Total Internal Reflection in Mirco-Hemispheres" International Display Research Conference, Issue No. 1083-1312/00/2003-0233, Sep. 2003, pp. 233-236.

Mossman, M. et al., "Grey Scale Control of Total Internal Reflection Using Electrophoresis of Sub-Optical Pigment Particles" International Conference of the Society for Information Display, Boston, MA Issue No. 2-0966X/02/3301-0522, May 2002, pp. 522-525.

Coope, R. et al., "Modulation of Retroreflection by Controlled Frustration of Total Internal Reflection" Applied Optics vol. 41, Issue No. 25, Sep. 1, 2002, pp. 5357-5361.

Mossman, M. et al., "New Method for Maintaining Long Term Image Quality in a TIR Based Electrophoretic Display" International Display Research Conference, Nice, France, EURODISPLAY Oct. 2002, pp. 851-854.

Mossman, M. et al., "New Reflective Color Display Technique Based on Total Internal Reflection and Subtractive Color Filtering" International Conference of the Society for Information Display, San Jose, CA Issue No. 1-0966X/01/3201-1054, Jun. 2001, pp. 1054-1057.

Whitehead, L. et al., "Visual Applications of Total Internal Reflection in Prismatic Microstructures" Physics in Canada Nov./Dec. 2001, pp. 329-335.

Mossman, M. et al., "A New Reflective Display Based on Total Internal Reflection in Prismatic Microstructures" Proceedings of the 2000 Society for Information Display, International Display Research Conference, Issue No. 1083-1312/00/2001-0311, Oct. 2000, pp. 311-314.

International Search Report and Written Opinion dated Jul. 8, 2014 for PCT Application No. PCT/US2013/049606.

International Search Report and Written Opinion dated Dec. 30, 2014 for PCT Application No. PCT/US2014/058118.

International Search Report and Written Opinion dated Aug. 11, 2014 for PCT Application No. PCT/US2014/030966.

International Search Report and Written Opinion dated Sep. 19, 2014 for PCT Application No. PCT/US2014/038091.

International Search Report and Written Opinion dated Oct. 1, 2015 for PCT Application No. PCT/US2015/030349.

International Search Report and Written Opinion dated Apr. 3, 2015 for PCT Application No. PCT/US2014/061911.

International Search Report and Written Opinion dated Mar. 1, 2016 for PCT Application No. PCT/US2015/013725.

International Search Report and Written Opinion dated Jan. 27, 2016 for PCT Application No. PCT/US2015/054385.

International Search Report and Written Opinion dated Mar. 2, 2016 for PCT Application No. PCT/US2015/062075.

International Search Report and Written Opinion dated Apr. 13, 2016 for PCT Application No. PCT/US2015/066980.

International Search Report and Written Opinion dated Apr. 21, 2016 for PCT Application No. PCT/US2016/017416.

International Search Report and Written Opinion dated Mar. 28, 2016 for PCT Application No. PCT/US2015/066150.

Kambe, N. et al., "Refractive Index Engineering of nano-Polymer Composites," Symposium, Apr. 20, 2001, 6 pages, Materials Research Society Symposium Proceedings, Pittsburgh, PA.

Robben, B. et al., "Electrodynamics of Electronic Paper Based on Total Internal Reflection," Journal, Sep. 20, 2018, pp. 034041-1-034041-11, DOI 10.1103/PhysRevApplied.10.034041, Americal Physical Society.

* cited by examiner

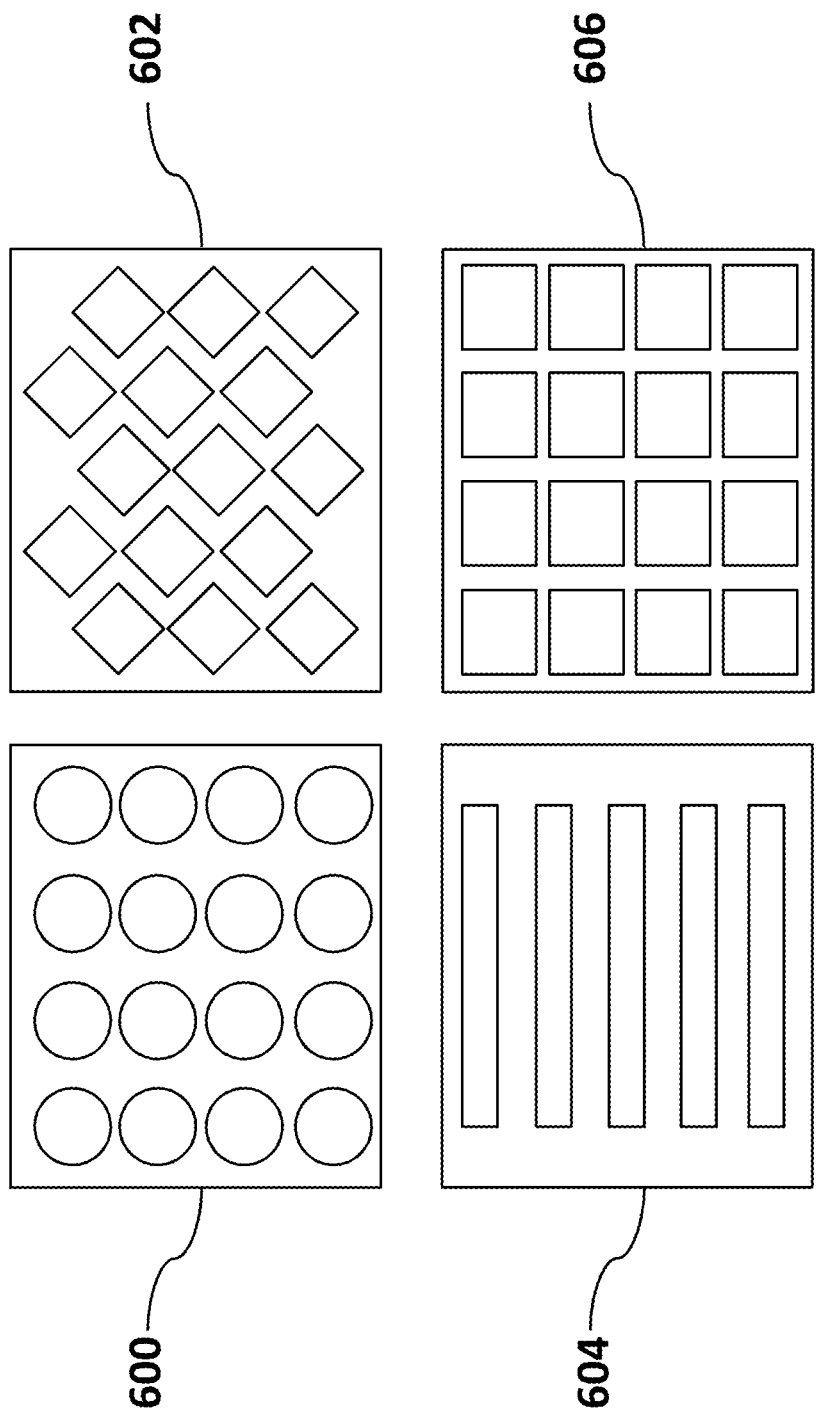

METHOD AND APPARATUS FOR A DRY PARTICLE TOTALLY INTERNALLY REFLECTIVE IMAGE DISPLAY

This application claims the filing date benefit of U.S. Provisional Application No. 62/184,186, filed on Jun. 24, 2015, the entirety of which is incorporated herein by reference.

FIELD

The instant disclosure is directed to a method and apparatus for dry particle totally internally reflective image displays. Specifically, an embodiment of the disclosure relates to a totally internally reflective image display comprising dry particles dispersed in a gas.

BACKGROUND

Conventional reflective image display technology utilizes two contrasting colored particles of opposite charge polarity dispersed in a liquid medium and contained within a microcapsule. The particles may be moved electrophoretically by application of a voltage bias to reflect or absorb incident light to display bright, dark and gray image states to the viewer. The electrophoretic two particle display provides diffused reflection very much like the viewing experience of traditional paper along with long battery life. However, the limited brightness and slow switching speed of the two particle display limits its use in applications such as web browsing and viewing of video content.

Light modulation in conventional total internal reflection (TIR) image displays may be controlled by movement of electrophoretically mobile particles into and out of the evanescent wave region at the surface of the front sheet. The front sheet may comprise of a plurality of structures such as convex protrusions of a hemispherical shape that are capable of total internal reflection of light. The front sheet typically further contains a transparent electrode layer. The rear sheet may include a rear electrode layer. An electrophoretic medium consisting of electrophoretically mobile particles comprising of a charge polarity suspended in a fluid is disposed between the front and rear sheets. An applied voltage moves the electrophoretically mobile particles through the liquid electrophoretic medium where they may be moved to the front sheet and into the evanescent wave region where TIR may be frustrated. Thus the display may be referred to as a frustratable total internal reflection (FTIR) display. The modulation of particles of only one charge polarity and the fact that TIR frustration happens within the evanescent region which is only about 0.5 µm thick, allows the switching speed of a FTIR display to be much faster than the traditional dual particle electrophoretic display technology described in the preceding paragraph. This is due to the fact that the particles in FTIR displays may only need to move a much shorter distance than particles in conventional two particle electrophoretic displays.

Dry toner particles developed for the electrophotographic industry are charged particles that move through air under the influence of an applied electric field. These types of particles may also be used in FTIR-based displays to further increase the rate of movement of the particles. Additionally, the maximum reflection (brightness) of a FTIR display is determined by the refractive index difference between the materials that constitute the front sheet and the medium that is in contact with the hemisphere film. Dry particle FTIR displays use a gas instead of liquid as the medium to carry the charged particles. Dry particles that are moved by an applied electric field in a gas are referred to as electrostatically mobile particles. Charge particles that are moved by an electric field in a liquid or fluid medium are referred to as electrophoretically mobile particles.

A gas provides maximum refractive index difference with the hemisphere TIR film thus yielding the maximum level of brightness the display may attain. At normal incidence, the reflectance R of a hemisphere of a transparent front sheet is given by equation (1):

$$R = 1 - \left(\frac{\eta_m}{\eta_h}\right)^2 \quad (1)$$

where $\eta_h$ is the refractive index of a hemisphere of a transparent front sheet and $\eta_m$ is the refractive index of medium adjacent the surface of a hemisphere of the front sheet where TIR occurs. Thus, if the hemisphere is formed of a higher refractive index material such as polycarbonate ($\eta_h \sim 1.59$) and if the adjacent medium is a fluorinated solvent such as Fluorinert ($\eta_m \sim 1.27$) with a lower refractive index, a reflectance R of about 36% may be attained. In comparison, if the medium is a gas ($\eta_m \sim 1$), a reflectance R of about 60% may be attained. From the calculation it can be determined that using a gas as the medium containing the particles may be a major advantage over conventional reflective displays. Furthermore, there is only one plurality of one type of particle present in the display. Thus, only the interaction of the plurality of one type of particle with the electrode surface and not with a plurality of particles of opposite charge polarity (other than small non-optically active counterions) and color must be considered when determining the display's optical performance.

BRIEF DESCRIPTION OF DRAWINGS

These and other embodiments of the disclosure will be discussed with reference to the following exemplary and non-limiting illustrations, in which like elements are numbered similarly, and where:

FIG. 6. illustrates top views of representative examples of rear sheets with partition walls;

DETAILED DESCRIPTION

Throughout the following description specific details are set forth in order to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive, sense.

Figure 1:
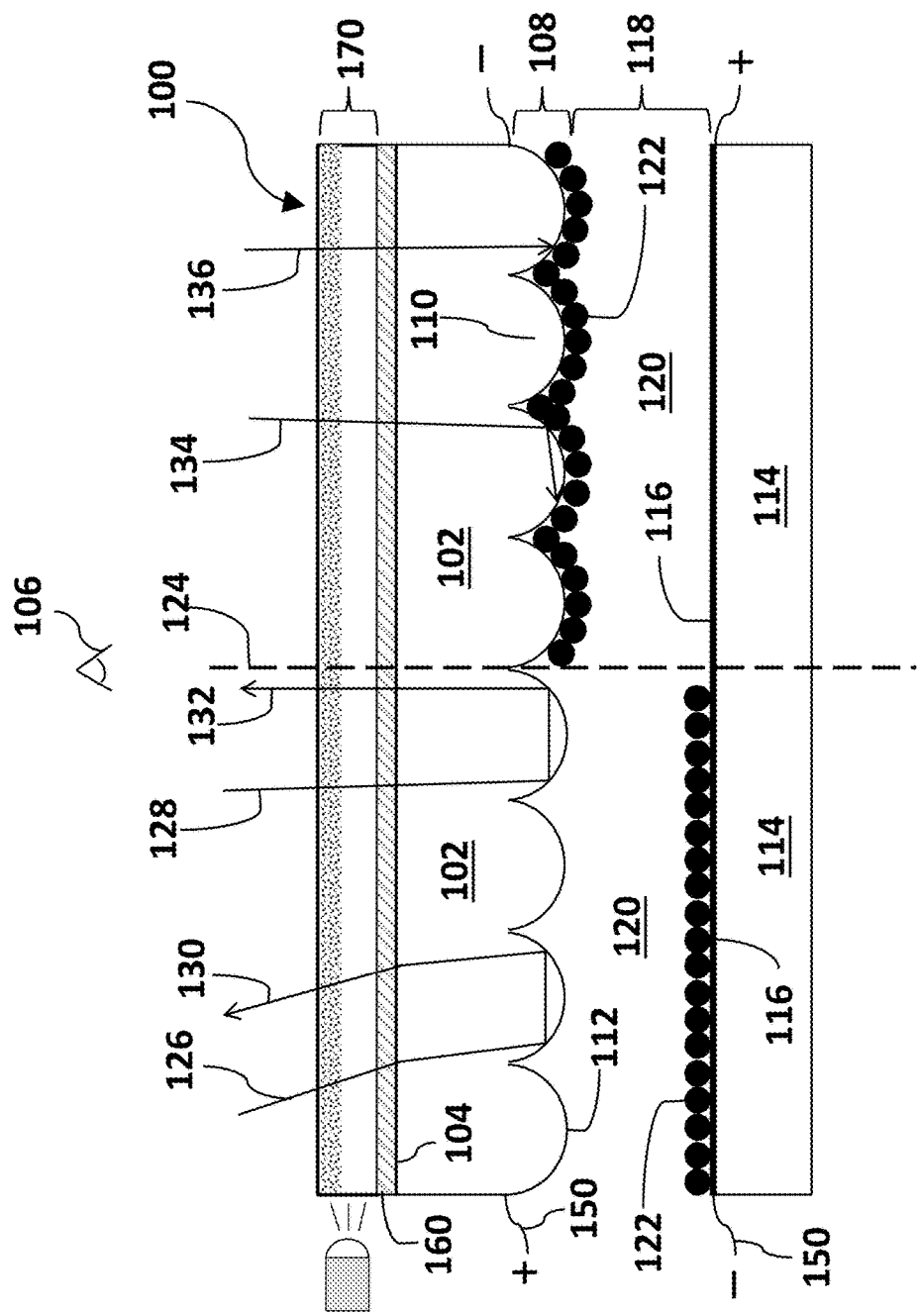
FIG. 1 depicts a cross-section side of a portion of an FTIR reflective image display comprising of particles in a gas.

FIG. 1 depicts a cross-section side of a portion of an FTIR reflective image display comprising of particles in a gas. In the embodiment in FIG. 1, display 100 comprises transparent front sheet 102 with outward or distal surface 104 facing viewer 106. The inward or proximal surface of sheet 102 further comprises a plurality 108 of individual convex protrusions 110. It should be noted that the examples of transparent TIR-capable front sheets described herein will comprise a plurality of convex protrusions such as hemispherical protrusions for illustrative purposes. Other non-limiting structures may be used to create TIR front sheets such as micro-prisms, beads, hemibeads, hemispheres or other shapes. They may face inward forming a contoured surface capable of total internal reflection of light rays.

Display embodiment 100 may further comprise a front transparent electrode layer 112 located on the surface of the hemispherical array 108. Electrode layer 112 may comprise one or more of indium tin oxide (ITO), an electrically conducting polymer such as BAYTRON™ or conductive nanoparticles, metal nanowires, graphene or other conductive carbon allotropes or a combination of these materials dispersed in a substantially transparent polymer. Alternatively the front sheet may be embedded with electrically conductive additives to create a front sheet with dual properties of TIR and electrical conduction instead of having a discrete and separate electrode layer 112 and could be used in all embodiments described herein. For illustrative purposes a separate electrode layer will be described herein.

An optional dielectric layer (not shown) may be located on the surface of the transparent front electrode layer 112. The optional dielectric layer may comprise a polymer or glass. In an exemplary embodiment the dielectric layer may comprise parylene. In other embodiments the dielectric layer may comprise a halogenated parylene. In an exemplary embodiment the dielectric layer may comprise polyimide. In other embodiments the dielectric layer may comprise $SiO_2$, fluoropolymers, polynorbornenes or hydrocarbon-based polymers lacking polar groups.

Display 100 may further comprise a backplane or rear support 114. Rear support may comprise an electrode layer 116 acting as the rear electrode. Rear electrode 116 may comprise one or more of a thin film transistor (TFT) array, patterned direct drive array or a passive matrix array of electrodes. An optional dielectric layer (not shown) may be located on top of the rear electrode layer 116. The optional dielectric layers may each have a thickness of at least 80 nanometers. In an exemplary embodiment, the thickness is about 80-200 nanometers. Advantageously, parylene has a low dielectric constant and may be made as thin as 20 nanometers without having pinhole leakage paths. Such features contribute to display structures having a comparatively high capacitance per unit area.

Within the cavity 118 formed by the front sheet 102 and rear support sheet 114 is a gaseous medium 120. Gaseous medium 120 may comprise one or more of nitrogen, air, carbon dioxide, argon, oxygen, neon, xenon, helium or hydrogen. Medium 120 may further comprise a plurality of light absorbing, electrostatically mobile particles 122. Particles 122 may comprise a negative or positive charge polarity and may further be capable of being electrostatically moved by application of a voltage bias across medium 120 by the front 112 and rear electrode 116 layers. A voltage bias 150 may be created by a voltage source (not shown). In an exemplary embodiment the gaseous medium may have a relative humidity at 25° C. of not more than about 60% RH. In other embodiments, the medium supporting the particles may be a vacuum. The vacuum may be a relative vacuum or a substantially absolute vacuum.

Particles 122 may be a dye or pigment or a combination thereof. Particles 122 may be comprised of an organic material or an inorganic material or a combination of an inorganic and organic material. In certain embodiments, particles 122 may have a diameter in the range of about 0.02-20 µm. In other embodiments, particles may have a particle size distribution of d50 in the range of about 0.02-20 µm (wherein d50 is about where 50% of the particles have a diameter below a particular size and the diameter of about 50% of the particles are above a particular size). The particles 122 in FIG. 1 and further described in the embodiments throughout this disclosure may exhibit such excellent fluidity such that there is substantially no angle of repose defining the fluidity of the particles. The angle of repose is the maximum slope that is measured in degrees from the horizontal at which loose particles will remain in place without sliding or slipping. The smaller the repose angle the more the particles behave as a liquid.

Display 100 in FIG. 1 may be operated as follows. It should be noted that it will be assumed that the particles 122 may comprise a net positive charge polarity for descriptive purposes only. They may also comprise a net negative charge polarity. Upon application of a negative voltage bias at rear electrode layer 116, as depicted in FIG. 1 on the left side of the dotted line 124, particles 122 may be electrostatically moved near rear electrode layer 116. This allows incident light rays to be totally internally reflected. This is represented by incident light rays 126 and 128 in FIG. 1. Light rays 126 and 128 may be totally internally reflected at the interface of the surface of front sheet 102 and medium 120 and emerge as reflected light rays 130 and 132, respectively. This may create a light or bright state of the display. On the right side of the dotted line 124, depicts a dark or light absorbing state of the display. A negative voltage bias may be applied at the front electrode layer 112, where particles 122 may be electrostatically moved to from rear electrode 116. At front electrode 112, the particles 122 may enter the evanescent wave region and frustrate total internal reflection (TIR). This is represented in FIG. 1 by incident light rays 134 and 136 absorbed by particles 122 which may create a dark state of the display.

Figure 2:
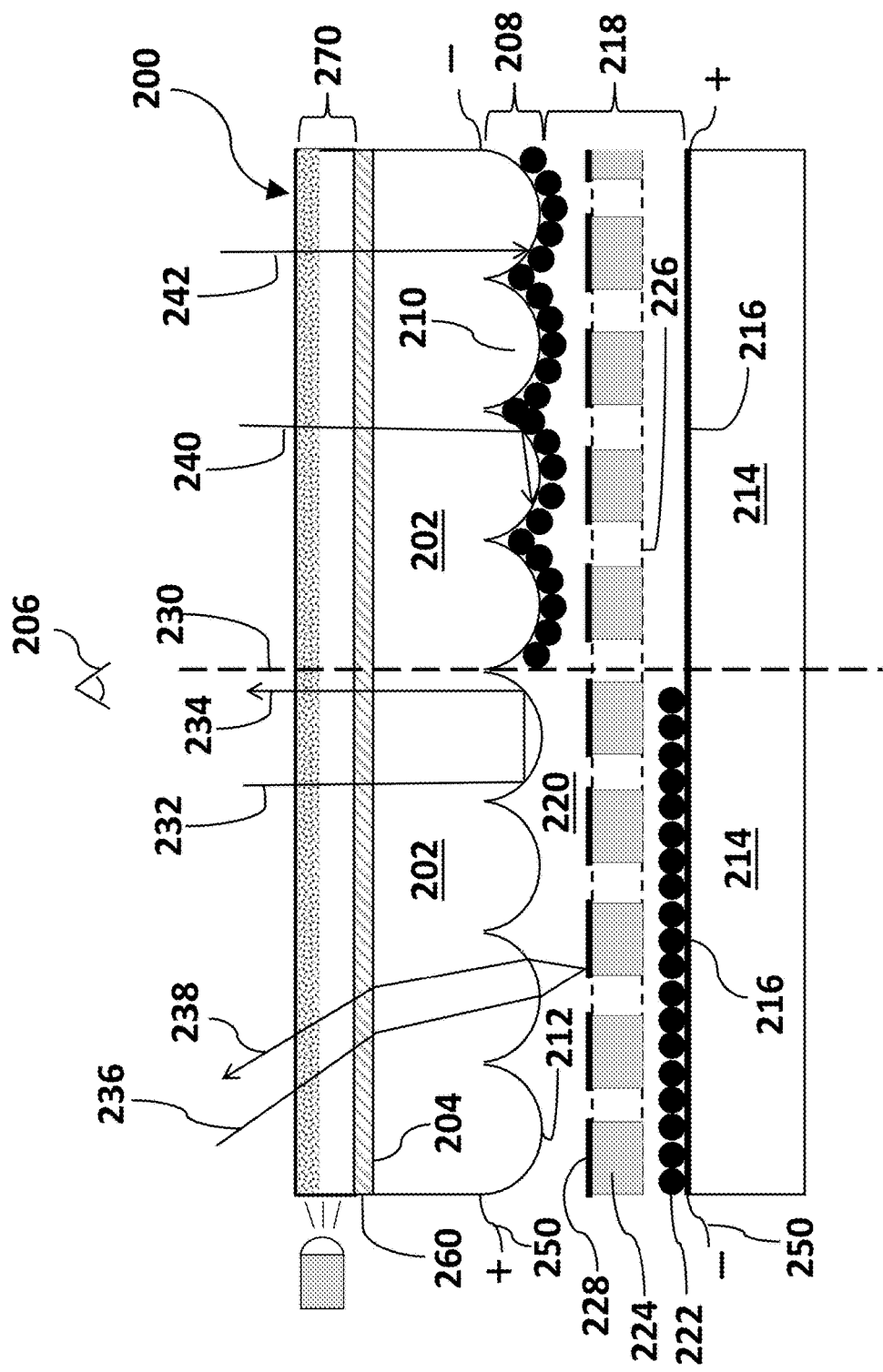
FIG. 2 depicts a cross-section of a portion of an FTIR reflective image display comprising of particles in a gas and a perforated reflective film.

FIG. 2 depicts a cross-section of a portion of an FTIR reflective image display comprising of particles in a gas and a perforated reflective film. Display 200 is similar to display 100 but further comprises a perforated reflective film. In this embodiment, display 200 comprises transparent front sheet 202 with outer surface 204 facing viewer 206. Transparent front sheet 202 further comprises a plurality 208 of individual convex protrusions 210 facing inward. On the surface of the plurality of convex protrusions 208 is a front transparent electrode layer 212. An optional dielectric layer (not shown) may be on layer 212. The display embodiment 200 in FIG. 2 further comprises a backplane or rear support layer 214 with a top electrode layer 216 acting as the rear electrode. An optional dielectric layer (not shown) may be located on the rear electrode layer 216. Within cavity 218 formed by front sheet 202 and rear sheet 214 is a gaseous medium 220 and light absorbing electrostatically mobile particles 222 capable of being moved by application of a voltage bias 250 across cavity 218 by an external voltage source (not shown).

Display 200 in FIG. 2 further comprises a perforated film or membrane 224 situated between the front 202 and rear sheet 214. Film 224 may be continuous in nature as denoted by the dotted lines 226. Porous film 224 may also have a reflective layer 228 on top and facing sheet 202 to reflect light rays.

Display 200 in FIG. 2 may be operated as follows. Upon application of a voltage bias, for example, as depicted in FIG. 2 on the left side of the dotted line 230, particles 222 may be electrostatically forced through the perforations of the perforated film 224 towards rear electrode layer 216. This allows incident light rays to be totally internally reflected at the interface of the surface of the plurality of convex protrusions 208 and medium 220. This is represented by light ray 232 that is totally internally reflected and emerges as reflected light ray 234. This creates a light or bright state of the display. Some light rays may pass through the dark pupil region in the center of the protrusions 210 and do not undergo total internal reflection. Often these light rays are "lost" and are not reflected back towards the viewer lowering the efficiency of the display. Addition of perforated film 224 with a top light reflection layer 228 reflects these light rays back towards viewer 206. This increases the efficiency and brightness of the display. This is illustrated by representative incident light ray 236 that is not "lost" but instead may be reflected back towards viewer 206 as shown by reflected light ray 238.

The right side of dotted line 230 of display 200 in FIG. 2 depicts a dark or light absorbing state of the display. As the voltage bias may be reversed, particles 222 may be electrostatically moved from rear electrode layer 216 through the perforated film 224 and gaseous medium 220 towards front electrode 212. Particles 222 may enter the evanescent wave region and frustrate TIR. This is represented by incident light rays 240 and 242 absorbing incident light to create a dark state of the display.

Figure 3:
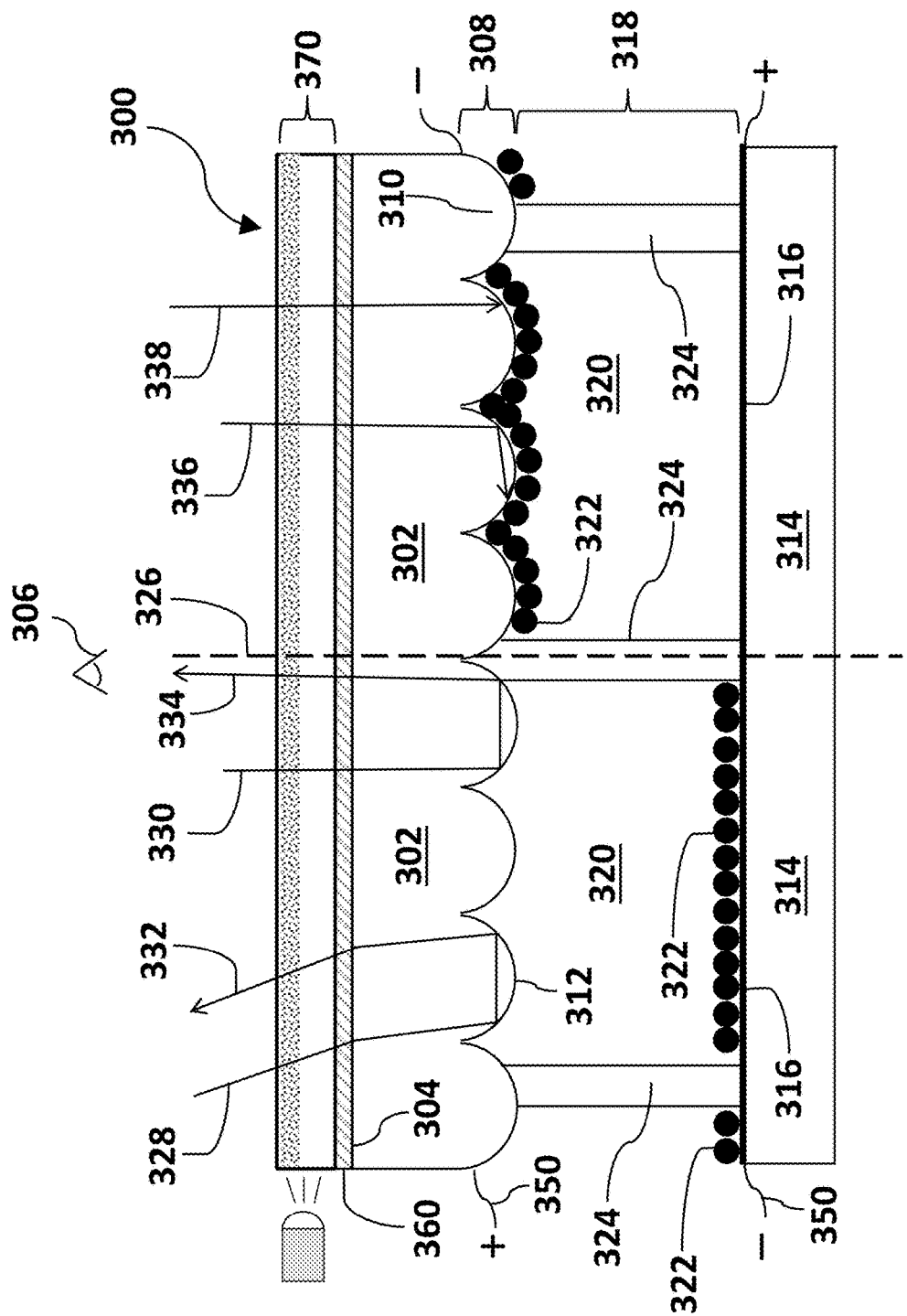
FIG. 3 depicts a cross-section of a portion of an FTIR reflective image display comprising of particles in a gas and partition walls.

FIG. 3 depicts a cross-section of a portion of an FTIR reflective image display comprising of particles in a gas and partition walls. Display embodiment 300 is similar to display 100 except that display 300 further comprises partition walls. In this embodiment, display 300 comprises transparent front sheet 302 with outer surface 304 facing viewer 306. Transparent front sheet 302 further comprises a plurality 308 of individual convex protrusions 310 facing inward. On the surface of the plurality of convex protrusions 308 is a front transparent electrode layer 312. An optional dielectric layer (not shown) may be on layer 312. The display embodiment 300 in FIG. 3 further comprises a backplane or rear support layer 314 with a top electrode layer 316 acting as the rear electrode. An optional dielectric layer (not shown) may be located on the rear electrode layer 316. Within cavity 318 formed by front sheet 302 and rear sheet 314 is a gaseous medium 320 and light absorbing electrostatically mobile particles 322 capable of being moved by application of a voltage bias across cavity 318 by an external voltage source (not shown).

Display 300 in FIG. 3 further comprises a plurality of individual partition walls 324 situated between rear support sheet 314 and front transparent sheet 302. The partition walls 324 may also be referred to, such as for example, walls, cross walls, side walls, dividers, etc. The partition walls 324 may partially or completely bridge the rear support 314 to the front sheet 302 creating a plurality of individual cells, compartments or wells. As illustrated in display 300 in FIG. 3, the partition walls 324 may be substantially uniform in thickness from the top to the bottom. They may be of various designs such as, but not limited to, have a tapered shape where they are wider at the bottom and thinner at the top where they are bonded to the top transparent layer 302. Conversely the partition walls may be tapered such that they are thinner at the bottom and wider at the top where they may be bonded to the top transparent layer 302. In some embodiments the partition walls 324 may be bonded to the rear support sheet 314. The individual cells confine the particles 116 to prevent powder migration or settling. The layer of individual wells may consist of a porous sheet of pre-fabricated cells or compartments bonded between the rear support 314 and the front transparent sheet layer 302. In an exemplary embodiment, the open rate of the wells is about 50% to about 95%. Alternatively, a rear support layer may have pre-fabricated partition walls 324 bonded to the top transparent sheet 302. In other embodiments the top transparent sheet 302 may have pre-fabricated walls 324 that may be bonded to a rear support sheet 314.

Display 300 in FIG. 3 may be operated as follows. Upon application of a voltage bias 350 of opposite polarity to the charge polarity of particles 322, for example, as depicted in FIG. 3 on the left side of the dotted line 326, particles 322 may be electrostatically moved within the cells or compartments towards rear electrode layer 316. This allows incident light rays to be totally internally reflected at the interface of the surface of the plurality of convex protrusions 308 and medium 320. This is represented by incident light rays 328 and 330 in FIG. 3 that may be totally internally reflected back towards viewer 306. This is represented by reflected light rays 332 and 334, respectively. This creates a light or bright state of the display. On the right side of dotted line 326 depicts a dark or light absorbing state of the display. As the voltage bias is reversed, particles 322 may be electrostatically moved within the cells or compartments from the rear electrode 316 to the front electrode 312. In this location the particles 322 may enter the evanescent wave region and frustrate TIR. This is exhibited by absorbed incident light rays 336 and 338 to create a dark state of the display. In some embodiments, each cell may be biased independently.

Figure 4:
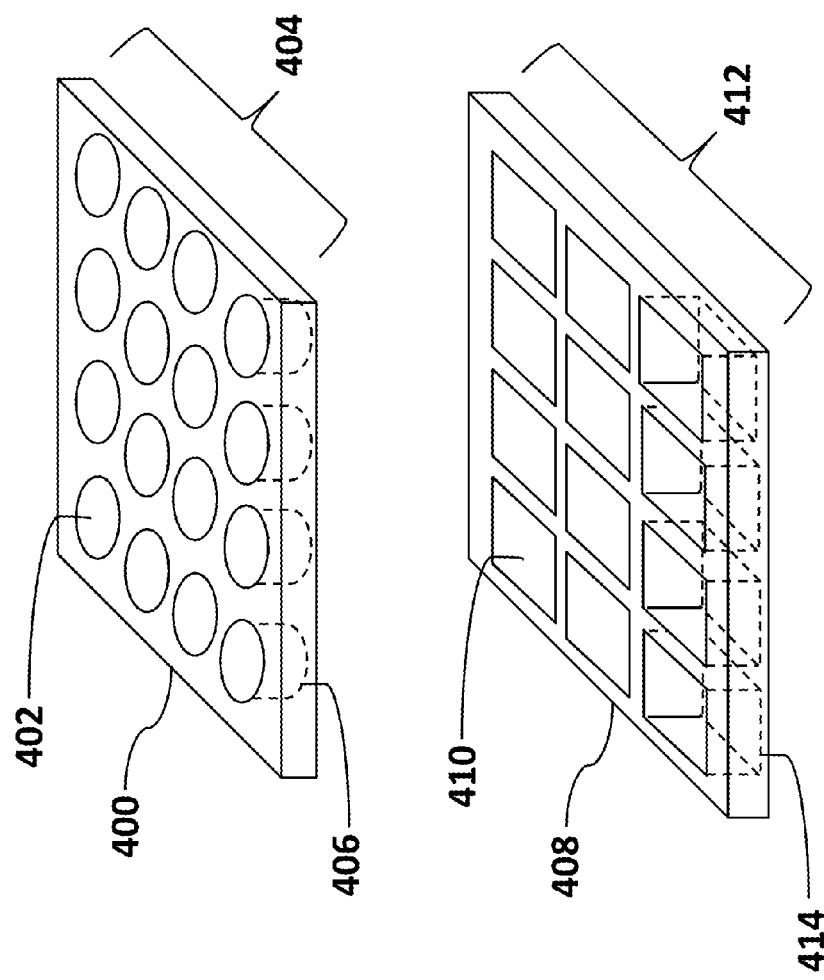
FIG. 4 illustrates representative examples of porous sheets.

FIG. 4 illustrates representative examples of porous sheets. A porous spacer sheet may be employed to create compartments as described in display embodiment 300 in FIG. 3 in order to confine the dry electrostatically mobile particles. The porous sheet may be situated between the top transparent sheet that comprises a plurality of convex protrusions and the rear support sheet in a layered structure. The porous spacer sheet may be bonded to the front and rear sheets. The electrostatically mobile particles and gaseous medium may be confined within the plurality of individual compartments. FIG. 4 illustrates two non-limiting examples of porous sheet designs that may be employed as porous spacer sheets. Sheet 400 comprises individual circular-like pores 402. The pores may be arranged in a substantially ordered array 404 of circular pores 402 as shown in FIG. 4 or in a disordered array. At least one pore may completely penetrate the sheet (represented by dotted lines 406) to allow for the particles to move between the front and rear electrodes.

Sheet 408 in FIG. 4 illustrates the pores may be in a rectangular-like shape 410. They may be arranged as a plurality in a substantially ordered array 412 or in a disordered array. At least one rectangular shaped pore may penetrate the sheet (represented by dotted lines 414) completely to allow for the particles to move between the front and rear electrodes. The pores may alternatively be in the shape of, but not limited to, diamonds, triangles, ovals, or hexagons in close-packed, loose, disordered or random arrays or a combination thereof. It is preferred that the open rate of the cells or compartments is about 50-95%. In some embodiments the walls of the porous sheets and other embodiments described herein with partition walls may comprise one or more of a coating of an anti-oxidant, oxygen scavenger or a moisture scavenger.

Figure 5A:
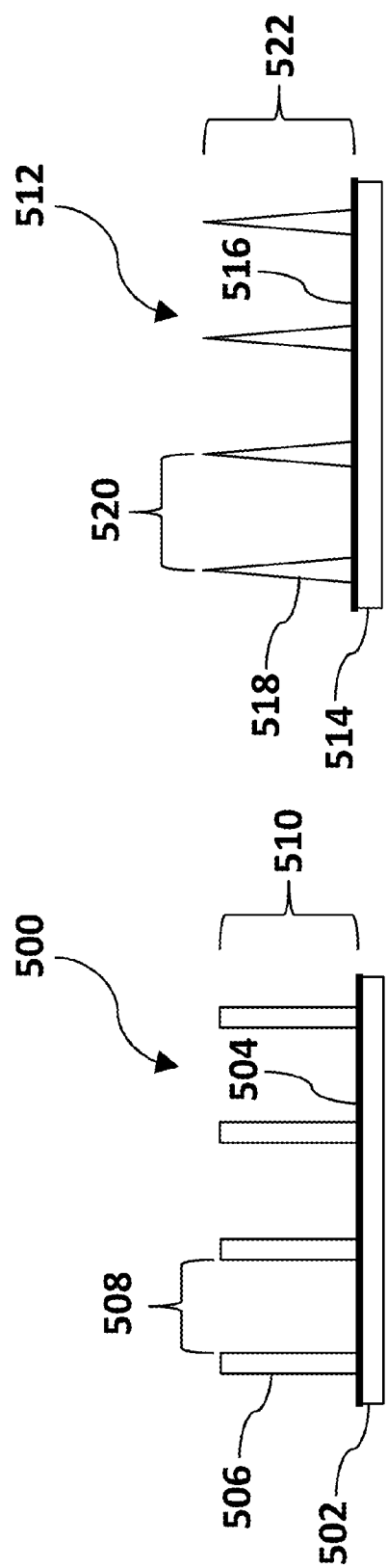
FIG. 5A depicts a cross-section of representative examples of rear sheets fabricated with partition walls.

FIG. 5A depicts a cross-section of representative examples of rear sheets fabricated with partition walls. Partition walls may be fabricated in a single structure with the transparent front sheet or rear support. In the non-limiting embodiments illustrated in FIG. 5A, partition walls may be attached to the rear support with open compartments to allow for the dry electrostatically mobile particles to be distributed within. The wall-rear sheet structure 500 on the left shown in FIG. 5A comprises a rear support 502 with a top electrode layer 504 acting as the rear electrode layer in the display. The rear electrode 504 may be a thin film transistor array, passive matrix grid array or a direct drive patterned array or a combination thereof. An optional dielectric layer (not shown) may be on top of the electrode layer 504. Further comprising the structure are vertical partition walls 506 that create individual compartments 508. A plurality of compartments 510 may be formed from the array of partition walls 510. In this example, the partition walls 506 may have vertical walls that are substantially perpendicular to the rear support 502 and rear electrode 504 layers. The walls 506 are substantially uniform in thickness along the length of the walls. In other embodiments the walls 506 may be non-uniform in thickness.

Embodiment structure 512 on the right in FIG. 5A is similar to the embodiment structure 500 on the left and comprises a rear support 514 with electrode layer 516, vertical partition walls 518 that create individual compartments 520. A plurality of compartments 522 may be formed from the array of partition walls. In this embodiment, the partition walls 518 are tapered and are substantially perpendicular to the rear support 514 and rear electrode 516 layers. The walls 518 are thickest at the base adjacent the rear support 514 and become thinner towards the top of the wall 518. In an exemplary embodiment, the partition walls with a tapered structure have different thickness at the transparent front sheet side than at the rear support side, such that (pore size at transparent front sheet)/(pore size at rear support) >1.1 is satisfied. In both embodiments shown in FIG. 5A, the compartments may be filled with dry electrostatically mobile particles and gas and then subsequently be fused or bonded with a transparent front sheet 102, 202 or 302 shown in FIG. 1-3, respectively.

Figure 5B:
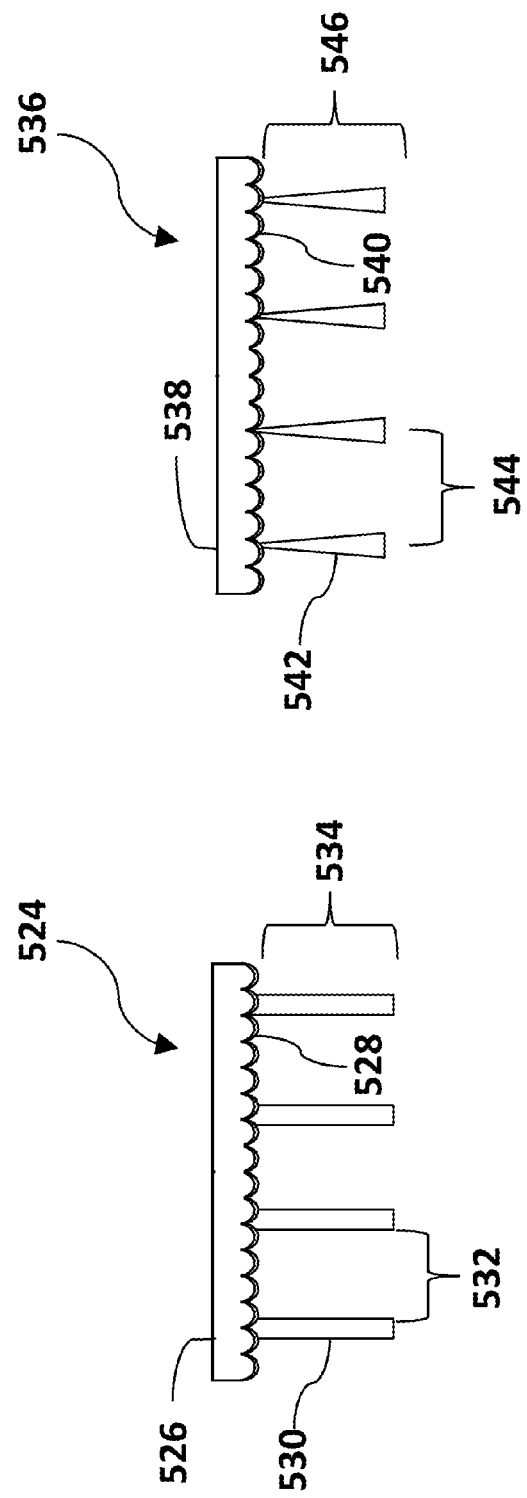
FIG. 5B depicts a cross-section of representative examples of front sheets fabricated with partition walls.

Alternatively the partition walls may be pre-fabricated such that they are connected to the transparent front sheet. FIG. 5B depicts a cross-section of representative examples of front sheets fabricated with partition walls. Structure 524 on the left comprises a transparent front sheet 526 comprising convex protrusions with an electrode layer 528 acting as the front electrode layer in the display. Top electrode 528 is ideally a transparent electrically conductive layer as previously described herein. Further comprising the structure are vertical partition walls 530 that create individual compartments 532. A plurality of compartments 534 may be formed from the array of partition walls. In this embodiment, the partition walls 530 are substantially perpendicular to the transparent front sheet 526 and electrode layer 528. The walls 530 are substantially uniform in thickness from top to bottom. In other embodiments the walls 530 may be non-uniform in thickness.

Structure 536 on the right in FIG. 5B is similar to structure 524 on the left. Structure 536 comprises a transparent front sheet 538 with transparent electrode layer 540 which would act as the top electrode layer in the display. Structure 536 further comprises vertical partition walls 542 that create individual compartments 544. A plurality of compartments 546 may be formed from the array of partition walls. In this embodiment, the partition walls 542 are tapered and are substantially perpendicular to rear support 538 and top electrode layer 540. The walls 542 may be thickest at the base of the partition walls and become thinner towards the top of the wall adjacent the transparent front sheet 538. In an exemplary embodiment, partition walls 542 with a tapered structure have different thickness at the transparent front sheet 538 side comprising of the plurality of convex protrusions and at the rear support side, such that (pore size at transparent front sheet)/(pore size at rear support)>1.1 is satisfied. In the embodiments 524 and 536 illustrated in FIG. 5B the compartments may be filled with dry electrostatically mobile particles and gas and fused or bonded with a rear support sheet. In an exemplary embodiment, the open rate of the cells or compartments is about 50-95%.

FIG. 6. illustrates top views of representative examples of rear sheets with partition walls. FIG. 6 illustrates multiple embodiments of partition wall structures that may be fabricated with the rear support sheet with open compartments. In some embodiments, these designs may also comprise partition walls fabricated with the transparent front sheet further comprising a plurality of convex protrusions. A variety of non-limiting compartment shapes and sizes may be constructed. In some embodiments the shapes may be circular compartments 600. In other embodiments the compartments may be diamond-shaped 602. In other embodiments the compartments may be rectangular-shaped 604. In other embodiments the compartments may be square-shaped 606. The embodiments are illustrated in FIG. 6. Other compartment shapes may be of, for example, ovals, triangles and hexagons. The compartments may have a random, disordered or regular array of shapes. The compartments may be a mixture of different shapes. For example, the compartments may be a random or regular array of circular, square or other shapes. Regardless of the design and shape of the compartments used the walls may be of uniform thickness or tapered or a combination thereof. In exemplary embodiments, the open rate of the cells or compartments is at least about 50% and up to about 95%.

Figure 7:
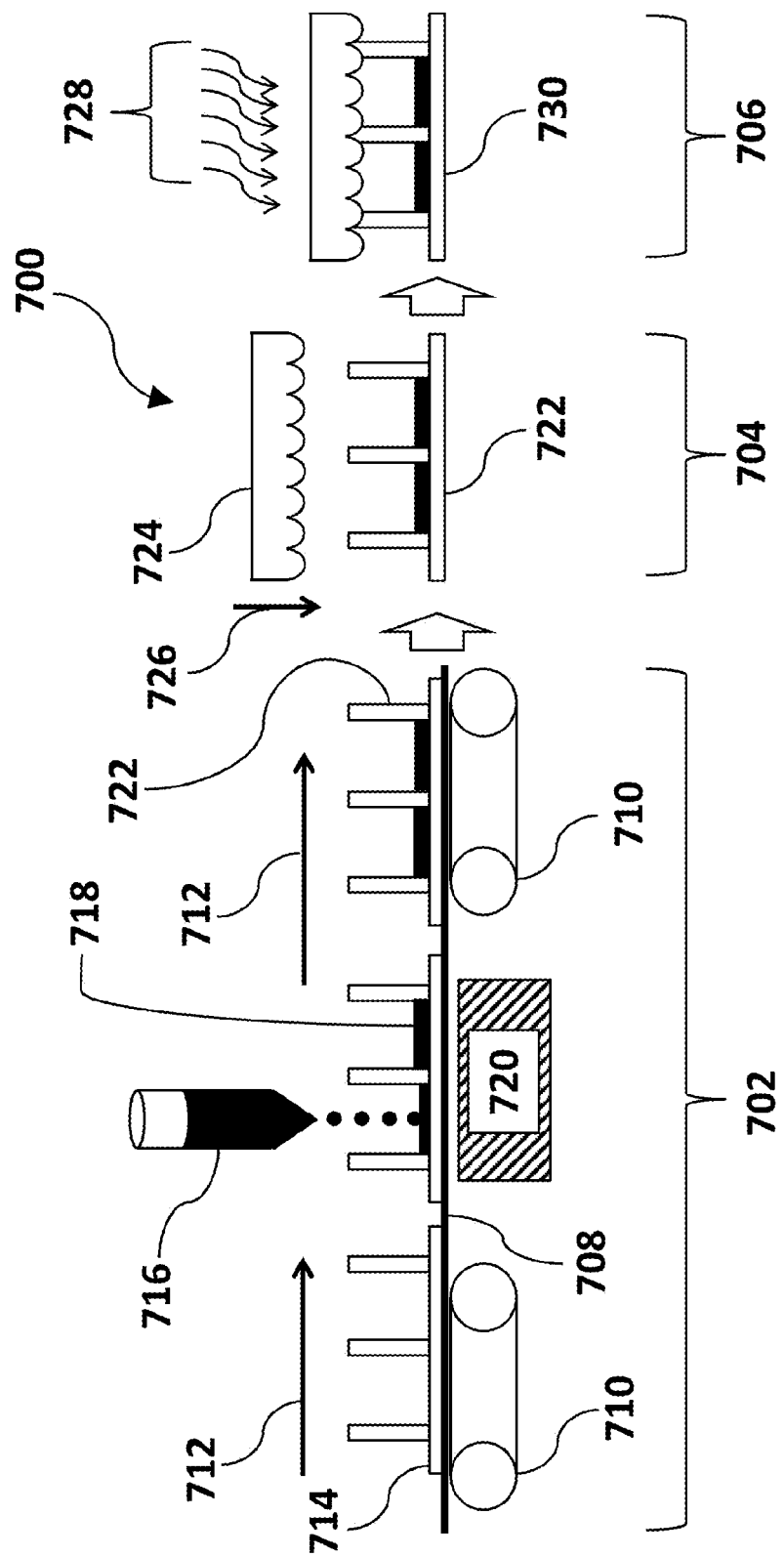
FIG. 7 is a schematic view of an embodiment of a roll to roll manufacturing apparatus and process to assemble dry particle FTIR image displays.

FIG. 7 is a schematic view of an embodiment of a roll to roll manufacturing apparatus and process to assemble dry particle FTIR image displays. The embodiment 700 comprising particles illustrated in FIG. 7 may comprise three primary steps: a first step of compartment filling of electrostatically mobile particles 702, a second step 704 of combining the top transparent layer comprising of convex protrusions such as hemispheres 704 and a final sealing step 706 to bond or adhere a top transparent layer to the top surface of the partition walls.

The first step 702 may comprise an assembly line such as a conveyer line or transporting belt-like surface 708 that may be moved by a plurality of rollers 710 or other means. The conveyer line may move from a left to right direction as shown in FIG. 7 and as depicted by directional arrows 712. The conveyer line 708 may further support a partially constructed image display 714 without particles. The partially constructed image display 714 depicted in FIG. 7 consists of a rear support, rear electrode and partition walls with open compartments or wells facing an upward direction such as those illustrated in the embodiments in FIG. 5A. Alternatively, the partially constructed image displays 714 depicted in FIG. 7 may instead comprise partition walls connected to the top transparent layer as illustrated in the embodiments in FIG. 5B. Alternatively, partially constructed image display 714 may also be a rear support and electrode with a reflective porous layer as described in preceding paragraphs.

As the partially constructed image displays 714 move from a left to right direction moved by the conveyer belt 708 the display 714 may encounter a dry particle dispensing device 716. Dispensing device 716 may dispense charged electrostatically mobile particles 718 into the compartments to a desired level in a controlled manner. To aid in the filling of the compartments with particles 718, a transferring device 720 may be employed on the opposite side of the conveyer belt 708. The transferring device 720 may apply a potential of opposite charge polarity of the charge on the particles 718 to the surface of the image display 714. This may attract particles 718 and "pull" them into the individual compartments of the image display device 714. The particle filled partially constructed image display devices 722 filled by a dispensing method may be ready for the next step. It should be noted that a display comprising a plurality of particles of one charge polarity offers a significant manufacturing advantage over previously described displays comprising two pluralities of particles of opposite charge polarity in simplicity and cost. For single particle charge polarity FTIR displays described herein, only one step may be employed to fill the compartments with particles. Only one charge polarity may be required to attract the dry particles. For displays requiring two pluralities of particles each of opposite charge polarity, applying an attractive potential by transfer device 720 may attract the particles of opposite charge but may repel the particles of the same charge polarity. As a result, costly multiple manufacturing steps may be required to circumvent this problem.

Second step 704 illustrated in FIG. 7 may comprise combining the dry particle filled partially constructed image display device 722 with a top transparent layer comprising of convex protrusions 724. In this step an adhesive or glue may be applied to the top surface of the partition walls. The adhesive or glue may consist of, but not limited to, a thermally or UV-curable material. Once the adhesive is applied the top transparent layer 724 may be lowered in a direction denoted by arrow 726 onto the top surface of the partition walls further comprising of an adhesive.

In a final step, the adhesive or glue-like material may then be treated with UV light, heat or other means 728 to cure the adhesive and bond the top transparent sheet 724 to the top of the partition walls or alternatively to the top of an optional porous sheet to manufacture the finished image display 730. The entire process may be enclosed in a room with a desired humidity level to seal in gas with a desired humidity level.

In an exemplary embodiment the gas may have a relative humidity at 25° C. of not more than about 60%. Alternatively, the medium supporting the particles may be a vacuum. In an exemplary embodiment, the display may be hermetically sealed in such a way to prevent moisture or air ingress or to prevent moisture, gas or powder leakage.

Figure 8:
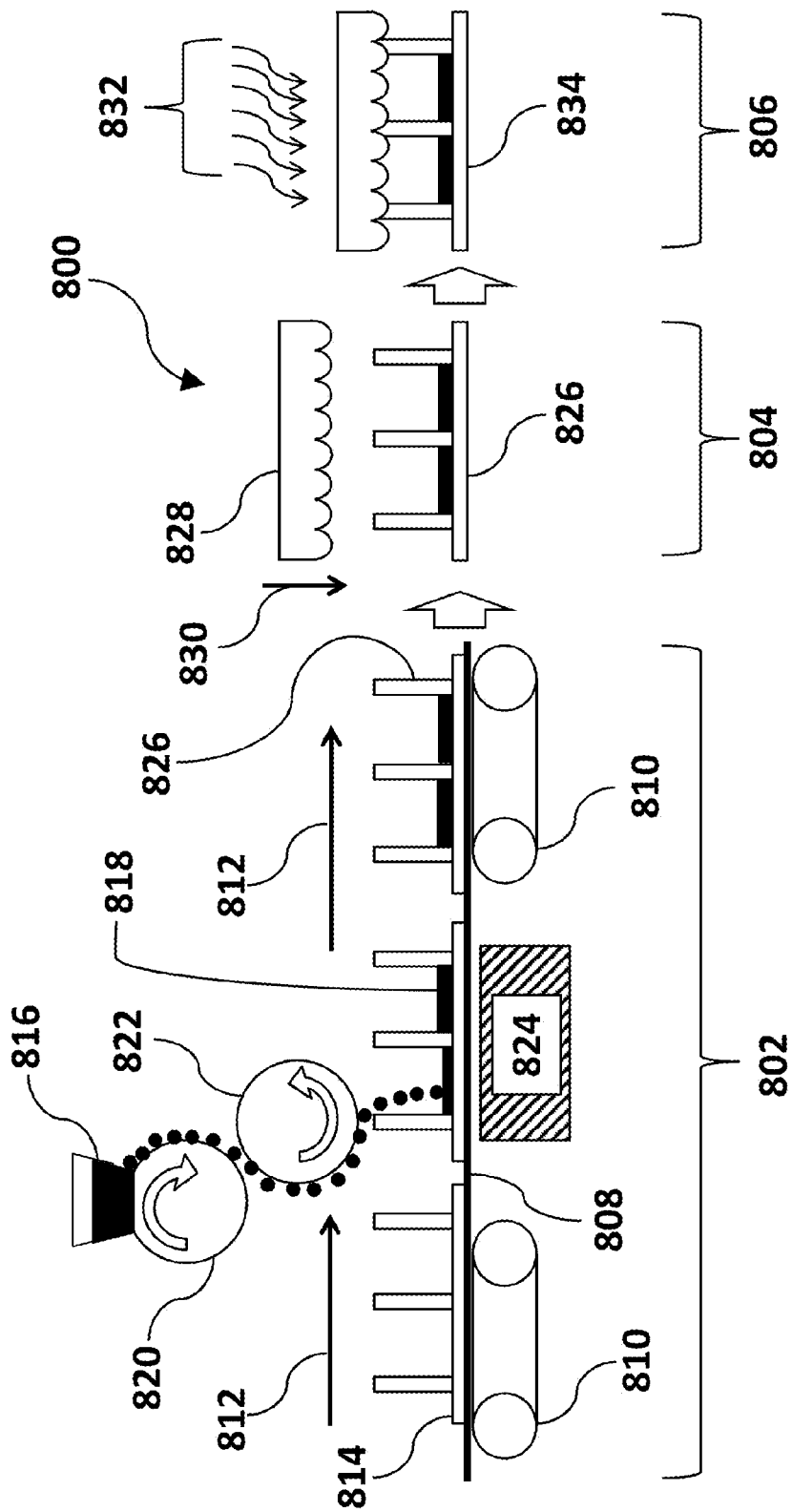
FIG. 8 is a schematic view of an embodiment of a roll to roll manufacturing apparatus and process to assemble dry particle FTIR image displays.

FIG. 8 is a schematic view of an embodiment of a roll to roll manufacturing apparatus and process to assemble a dry particle FTIR image display. The embodiment 800 comprising liquid powder illustrated in FIG. 8 may comprise three primary steps: a first step 802 for compartment filling of dry electrostatically mobile particles, a second step 804 combining the top transparent layer and a third and final sealing step 806 to bond or adhere the top transparent layer to the top surface of the partition walls.

The first step 802 may comprise of an assembly line such as a conveyer line or transporting belt-like surface 808 that may be moved by a plurality of rollers 810 or other means. The conveyer line may move from a left to right direction as shown in FIG. 8 and as depicted by directional arrows 812. The conveyer line 808 may further supports the partially constructed image display 814 without particles. The partially constructed image displays 814 depicted in FIG. 8 may consist of a rear support, rear electrode and partition walls with open compartments or wells facing an upward direction such as those found illustrated in embodiments in FIG. 5A. Alternatively, the partially constructed image displays 814 depicted in FIG. 7 may instead be partition walls connected to the top transparent layer as illustrated in the embodiments in FIG. 5B. Alternatively, partially constructed image display 814 may also be a rear support and electrode with a top reflective and porous layer as described in preceding paragraphs.

As the partially constructed image display 814 may move from a left to right direction and moved by the conveyer belt 808 the display 814 may encounter a dry particle or dispensing device. The dry particle dispensing device in FIG. 8 may comprise several components. A first receptacle 816 may hold an amount of particles that may uniformly deposit and dispense dry particles 818 onto a first rotating cylinder or drum 820. This drum may be charged of opposite charge polarity than that of the particles 818 to attract the particles. As the first drum 820 rotates in a first direction, a second drum 822 in close proximity may rotate in the opposite direction. The second drum 822 may have a charge of opposite polarity to that of the particles 818 and a stronger attractive force than the first drum so that the particles on the surface of the first drum 820 may transfer to the surface of the second drum 822. The particles 818 may be dispensed into the compartments of partially constructed image displays 814 to a desired level in a metered and controlled manner.

To aid in the filling of the compartments, a transferring device 824 may be employed on the opposite side of the conveyer belt 808. The transferring device 824 may be used to apply a potential of opposite charge of the charge polarity on particles 818 by imparting a charge on the surface of the image display 814. This may attract particles 818 and "pull" them into the individual compartments of the image display device 814. The charge polarity of the transferring device 824 may be of a stronger force than the charge on second drum 822 in order to pull the powder off of the surface of second drum 822. Alternatively, a single drum may be employed in combination with a dry particle receptacle or reservoir. Both processes are similar to xerographic (also known as electrophotographic) printing processes and many of the technologies and methods previously developed for xerography may be employed herein. The dry particle filled partially constructed image display devices 826 filled by a dispensing method are ready for the next step.

The second step 804 illustrated in FIG. 8 may comprise combining the particle filled partially constructed image display device 826 with the top transparent layer comprising of convex protrusions 828 is similar to that illustrated in FIG. 7. In this step an adhesive or glue may be applied to the top surface of the partition walls. The adhesive or glue may consist of, but not limited to, a thermally or UV-curable material. Once the adhesive is applied the top transparent layer 828 may be lowered in a direction denoted by arrow 830 onto the top surface of the partition walls further comprising an adhesive.

The third and final step, the adhesive or glue-like material may then be treated with UV light, heat or other means 832 to cure the adhesive. This may bond the top transparent sheet 828 to the top of the partition walls that may be brought into contact or alternatively to the top of an optional porous sheet to manufacture the finished image display 834. Additionally a color filter layer may be added to the top transparent front sheet 828 on the side facing the viewer opposite to the side comprising of the plurality of convex protrusions. The entire process may be enclosed in a room with a desired humidity level to seal in gas with a desired humidity level. In an exemplary embodiment, the gas may have a relative humidity at 25° C. of not more than about 60%. Alternatively the medium supporting the particles may be a vacuum. In an exemplary embodiment, the display may be hermetically sealed in such a way to prevent moisture or air ingress or to prevent moisture, gas or particle leakage. For both manufacturing method embodiments illustrated in FIGS. 7-8 and described herein, partition walls or a porous sheet or a combination thereof may alternatively be pre-formed and bonded onto the transparent top sheet, filled with dry particles and enclosed with a rear bonded sheet.

Figure 9:
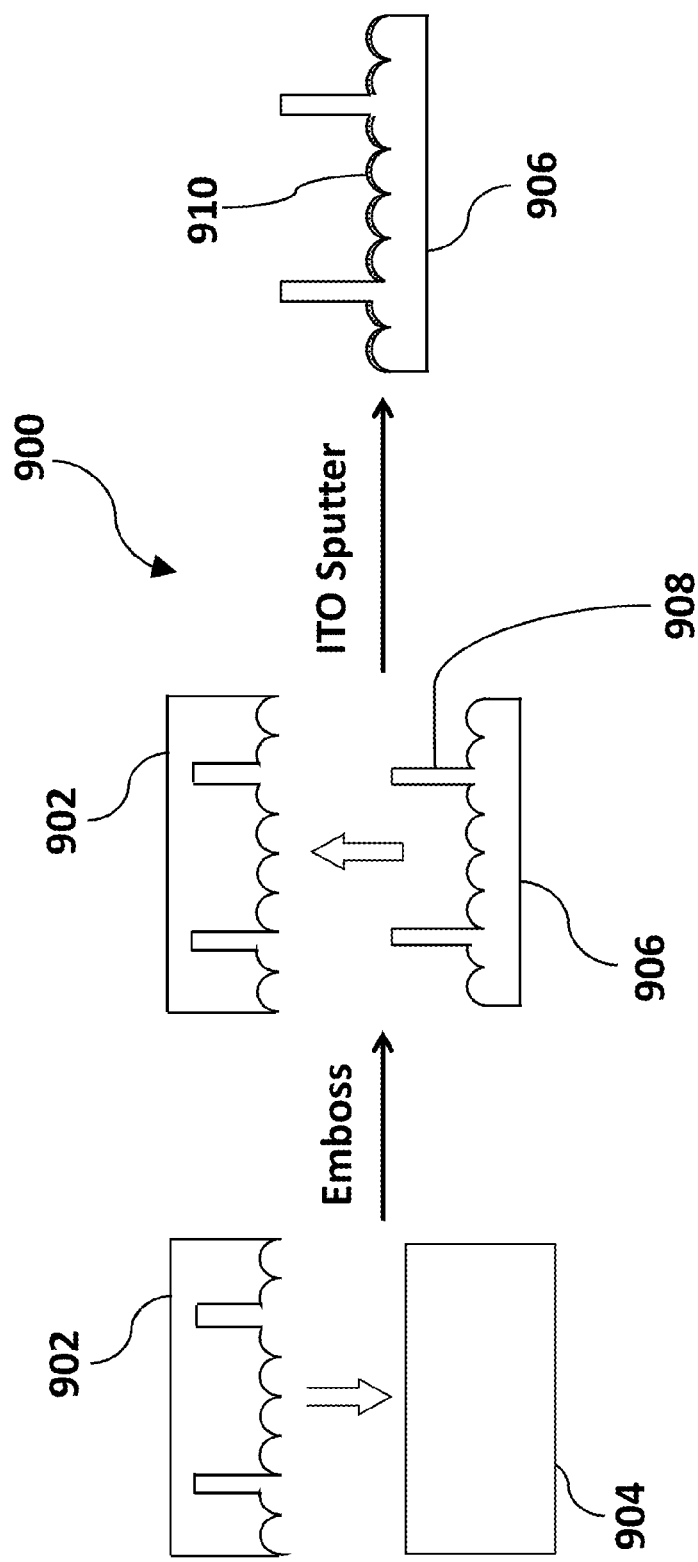
FIG. 9 is a schematic view of an embodiment of a roll to roll manufacturing apparatus and process to assemble the transparent top layer comprising of a plurality of convex protrusions, partition walls and electrode layer.

FIG. 9 is a schematic view of an embodiment of a roll to roll manufacturing apparatus and process to assemble the transparent top layer comprising of a plurality of convex protrusions, partition walls and electrode layer. In embodiment 900, a first stamp or die 902 may be heated. This alternatively may be a roller or press on a conveyer-like line (not shown). It may then be lowered onto a target material 904 which may optionally be heated to emboss a pattern onto the target sheet 904 in the form of hemisphere-like convex protrusions and partition walls. The stamp or die 902 may then be lifted off of target sheet 904 that has been thermally embossed into a transparent sheet with convex protrusions 906 and partition walls 908. In this embodiment the protrusions may be in the form of a plurality hemispheres though they may be other convex protrusions of microprisms. Alternatively, the embossing method may only comprise embossing the hemispherical structure. Other methods may be employed to create partition walls such as, but not limited to, a screen-printing method, an etching method or an inkjet printing method.

The embossed sheet 906 may then be sputtered with a thin layer of ITO 910 or other transparent electrically conductive material to act as the front electrode. Though not shown, a further layer may be added on top of the ITO layer 910 such as a dielectric layer. The dielectric layer may be comprised of an organic polymer or an inorganic oxide such $SiO_2$. The polymer may comprise parylene, a substituted parylene such as a halogenated parylene or a combination thereof. Additionally a color filter array layer may be further added onto the opposite side of the dielectric and electrode layers of the transparent front sheet 906.

Figure 10:
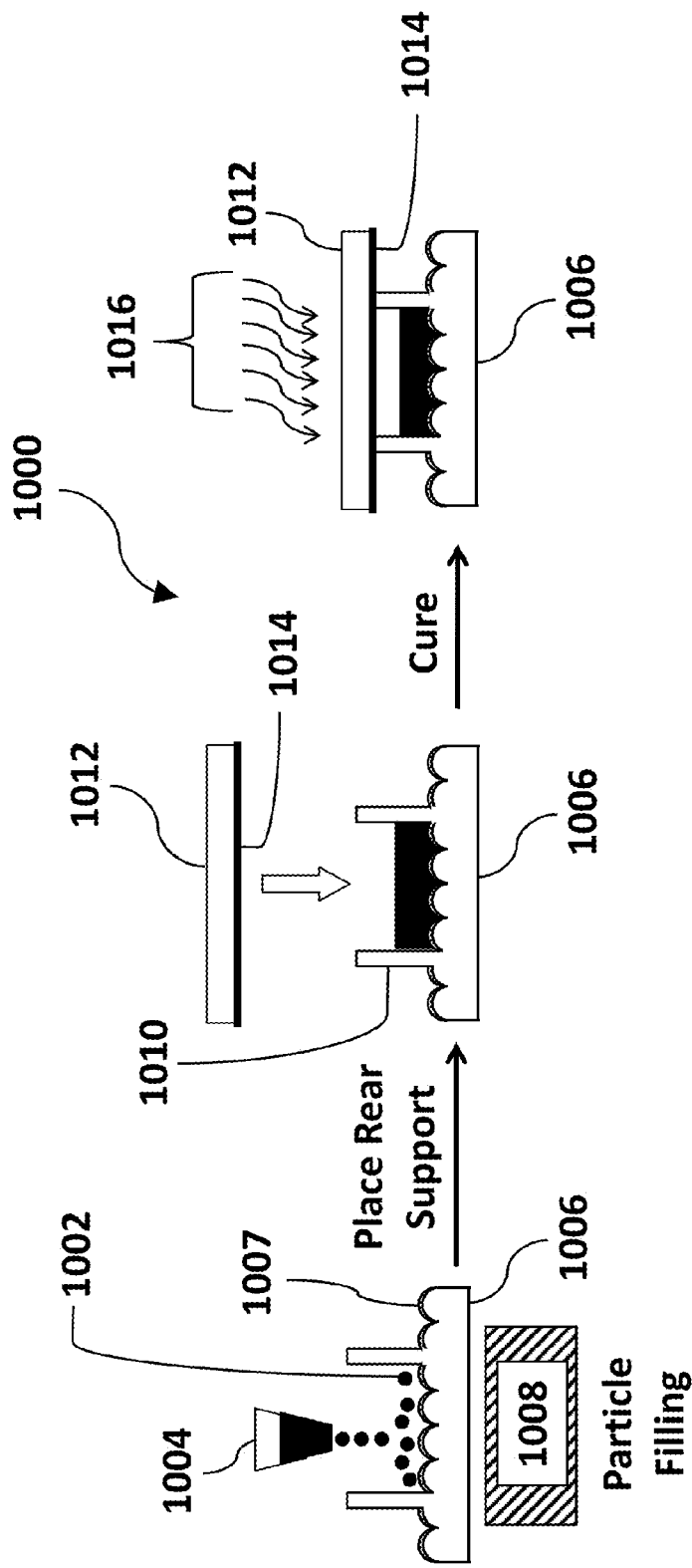
FIG. 10 is a schematic view of an embodiment of a roll to roll manufacturing apparatus and process to further assemble a dry particle FTIR image display with embossed partition walls connected to the transparent front sheet.

FIG. 10 is a schematic view of an embodiment of a roll to roll manufacturing apparatus and process to further assemble a dry particle FTIR image display with embossed partition walls connected to the transparent front sheet. In this embodiment 1000 comprising particles illustrated in FIG. 10 may comprise three primary steps: a first step dispensing a uniform amount of dry electrostatically mobile particles within the partition walls, a second step applying adhesive to top of partition walls and placing the rear support sheet and a third curing step to cure and bond the rear support layer to the top surface of the embossed partition walls. The process illustrated in FIG. 10 may be combined with a conveyer line or in an atmosphere of desired humidity level to seal in gas with a target humidity level within the partition walls or a combination thereof. Alternatively the medium supporting the particles may be a vacuum.

The first step illustrated in FIG. 10 is a process to uniformly dispense the dry particles 1002 into the individual compartments created by the partition walls. The process may include a dispensing unit 1004 that may be similar to the dispensing unit 716 illustrated in FIG. 7 and described previously herein. The dispensing unit 1004 may further comprise a particle receptacle or reservoir. Alternatively a drum-based dispensing method may also be employed such as that illustrated in FIG. 8 and described herein. In both methods it may be desirable to impart a charge onto the surface of the convex protrusions of the transparent sheet 1006 of opposite charge polarity of the particles. Transparent sheet 1006 may further comprise a transparent front electrode layer 1007. A dielectric layer may be located on the layer 1007. This may be carried out by means of a transferring device 1008 to attract the particles 1002 onto the surface of the transparent front sheet 1006 and within the compartments created by the partition walls.

The second step illustrated in FIG. 10 is to place a UV or thermally curable or other type of curable edge sealing glue or adhesive or other bonding material onto the top of the partition walls 1010. A rear support 1012 with an electrode layer 1014 comprising of a, for example, thin film transistor array layer, grid-like array or a direct drive patterned electrode array or a combination thereof may be brought into contact with the partition walls with a layer of adhesive.

The third and final step of assembly of the display is irradiation with UV light or heat 1016. This may cure the adhesive to bond the rear support layer to the partition walls to seal in the dry particles 1002 into the individual compartments. In an exemplary embodiment the compartments may be hermetically sealed such that no moisture or air ingress or gas loss is allowed and to keep the gas at a targeted humidity level. This may allow for consistent performance of the display.

Figure 11:
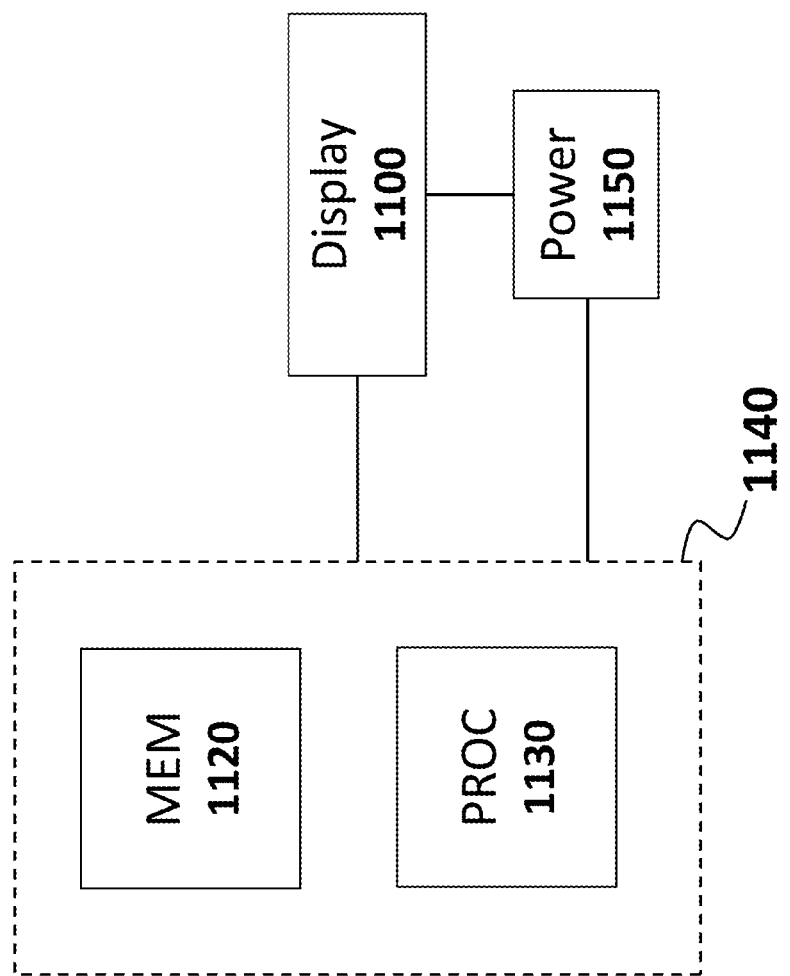
FIG. 11 schematically illustrates an exemplary system for implementing an embodiment of the disclosure.

FIG. 11 schematically illustrates an exemplary system for implementing an embodiment of the disclosure. In FIG. 11, dry particle display 1100 is controlled by controller 1140 having processor 1130 and memory 1120. Other control mechanisms and/or devices may be included in controller 1140 without departing from the disclosed principles. Controller 1140 may define hardware, software or a combination of hardware and software. For example, controller 1140 may define a processor programmed with instructions (e.g., firmware). Processor 1130 may be an actual processor or a virtual processor. Similarly, memory 1120 may be an actual memory (i.e., hardware) or virtual memory (i.e., software).

Memory 1120 may store instructions to be executed by processor 1130 for driving display 1100. The instructions may be configured to operate display 1100. In one embodiment, the instructions may include biasing electrodes associated with display 1100 (not shown) through power supply 1150. When biased, the electrodes may cause movement of dry particles towards or away from a region proximal to the surface of the plurality of protrusions at the inward surface of the front transparent sheet to thereby absorb or reflect light received at the inward surface of the front transparent sheet. By appropriately biasing the electrodes, particles (e.g., particles 122; in FIG. 1; particles 222 in FIG. 2; particles 322 in FIG. 3) may be moved near the surface of the plurality of protrusions at the inward surface of the front transparent sheet into or near the evanescent wave region in order to substantially or selectively absorb or reflect the incoming light. Absorbing the incoming light frustrates TIR and creates a dark or colored state. By appropriately biasing the electrodes, particles (e.g., particles 122 in FIG. 1; particles 222 in FIG. 2; particles 322 in FIG. 3) may be moved away from the surface of the plurality of protrusions at the inward surface of the front transparent sheet and out of the evanescent wave region in order to reflect or absorb the incoming light. Reflecting the incoming light creates a light or bright state.

The TIR image displays comprising dry particles in a gas described herein may further comprise a color filter array layer (e.g., 160 in FIG. 1; 260 in FIG. 2; 360 in FIG. 3). The color filter array layer may comprise at least one or more of red, green and blue or cyan, magenta and yellow filters.

The TIR image displays comprising dry particles in a gas described herein may further comprise a directional front light system (e.g., 170 in FIG. 1; 270 in FIG. 2; 370 in FIG. 3). The directional front light system may include a light source, light guide and an array of light extractor elements on the outward surface of the front sheet in each display. The directional light system may be positioned between the outward surface of the front sheet and the viewer. The front light source may define a light emitting diode (LED), cold cathode fluorescent lamp (CCFL) or a surface mount technology (SMT) incandescent lamp. The light guide may be configured to direct light to the front entire surface of the transparent outer sheet while the light extractor elements direct the light in a perpendicular direction within a narrow angle, for example, centered about a 30° cone, towards the front sheet. A directional front light system may be used in combination with partition walls or a color filter layer in the display architectures described herein or a combination thereof.

The TIR image displays comprising dry particles in a gas described herein may further comprise a directional front light system. The directional front light system may include a light source, light guide and an array of light extractor elements on the outward surface of the front sheet in each display. The directional light system may be positioned between the outward surface of the front sheet and the viewer. The front light source may define a light emitting diode (LED), cold cathode fluorescent lamp (CCFL) or a surface mount technology (SMT) incandescent lamp. The light guide may be configured to direct light to the front entire surface of the transparent outer sheet while the light extractor elements direct the light in a perpendicular direction within a narrow angle, for example, centered about a 30° cone, towards the front sheet. A directional front light system may be used in combination with partition walls or a color filter layer in the display architectures described herein or a combination thereof.

In other embodiments, any of the TIR image displays comprising dry particles in a gas described herein may further include at least one edge seal. An edge seal may be a thermally or photo-chemically cured material. The edge seal may comprise one or more of an epoxy, silicone or other polymer based material.

In other embodiments, any of the TIR image displays comprising dry particles in a gas described herein may further include a light diffusive layer to "soften" the reflected light observed by the viewer. In other embodiments a light diffusive layer may be used in combination with a front light.

In other embodiments, any of the TIR image displays comprising dry particles in a gas described herein may further include at least one spacer unit. The at least one spacer unit may control the spacing of the gap or cavity between the front and rear sheets. The at least one spacer unit may be comprised of one or more of glass, plastic or metal.

In other embodiments, any of the TIR image displays comprising dry particles in a gas described herein may further include a second plurality of dry electrostatically mobile particles of the same charge polarity. In certain embodiments, the second plurality of particles of the same charge polarity may exhibit a different color than the color of the first plurality of particles. In other embodiments, the first plurality of particles may exhibit a different voltage threshold than the second plurality of particles. The threshold voltage is the voltage bias at which the dry electrostatically mobile particles are moved within the display.

In other embodiments, any of the TIR image displays comprising dry particles in a gas described herein may further include a second plurality of dry electrostatically mobile particles of opposite charge polarity. In one embodiment, a first plurality of particles may be light absorbing and a second plurality of particles may be light reflecting such as metal particles or $TiO_2$. The second plurality of particles may enhance the reflectivity of the TIR bright state. This may be done by reflecting light that passes through the dark pupil region of the hemispherical front sheet.

In other embodiments, any of the TIR image displays comprising dry particles in a gas described herein may include more than two pluralities of dry electrostatically mobile particles of various charge polarities. For example, in some embodiments there may be two pluralities of particles with the same charge polarity and a first and second color combined with a third plurality of particles of opposite charge polarity and a third color.

In the display embodiments described herein, they may be used in such applications such as in, but not limited to, electronic book readers, portable computers, tablet computers, cellular telephones, smart cards, signs, watches, wearables, shelf labels, flash drives and outdoor billboards or outdoor signs comprising a display.

The display embodiments described herein may be powered by one or more of a battery, solar cell, wind, electrical generator, electrical outlet, AC power, DC power or other means.

The following exemplary and non-limiting embodiments provide various implementations of the disclosure.

Example 1 is directed to a total internal-reflection (TIR) display, comprising: a transparent front sheet having a flat distal surface and a proximal surface with an array of convex protrusions; a front electrode supported by the proximal surface of the transparent front sheet, the front electrode conforming to the hemispherical-shaped array; a rear electrode facing the front electrode, the rear electrode and the front electrode forming a sealed cavity therebetween; a gaseous medium stored in the sealed cavity; and a plurality of dry light-absorbing electrostatically mobile particles positioned in the sealed cavity, the electrostatically mobile particles configured to move within the sealed cavity in response to an electromagnetic bias imposed between the front electrode and the rear electrode.

Example 2 is directed to the display of example 1, wherein the gaseous medium comprises air having a relative humidity of 60% or less at about 25° C.

Example 3 is directed to the display of example 1 or 2, wherein the plurality of electrostatically mobile particles includes organic particles or inorganic particles or a combination of organic and inorganic particles and wherein each particle has a diameter in the range of about 0.02-20 µm.

Example 4 is directed to the display of any preceding example, further comprising a plurality of walls positioned between the rear electrode and the front electrode to form a plurality of cells, wherein each cell contains the gaseous medium.

Example 5 is directed to the display of any preceding example, wherein each cell is biased independently.

Example 6 is directed to the display of any preceding example, wherein at least a pair of the plurality of walls are parallel or non-parallel with each other.

Example 7 is directed to the display of any preceding example, further comprising a color filter layer.

Example 8 is directed to the display of any preceding example, further comprising a directional front light.

Example 9 is directed to a total internal-reflection (TIR) display, comprising: a transparent front sheet having a flat distal surface and a proximal surface with an array of convex protrusions; a front electrode supported by the proximal surface of the transparent front sheet, the front electrode conforming to the array of convex protrusions; a rear electrode facing the front electrode, the rear electrode and the front electrode forming a sealed gap therebetween; a plurality of dry light-absorbing electrostatically mobile particles positioned in the sealed gap, the electrostatically mobile particles configured to move within the sealed cavity in response to an electromagnetic bias imposed between the front electrode and the rear electrode; and wherein the sealed gap includes vacuum.

Example 10 is directed to the display of example 9, wherein the gap includes a substantially absolute vacuum.

Example 11 is directed to the display of examples 9 or 10, wherein the electrostatically mobile particles further comprise inorganic or organic material or a combination of inorganic and organic material and wherein each particle has a diameter in the range of about 0.02-20 µm.

Example 12 is directed to the display of any preceding example, further comprising a plurality of walls positioned between the rear electrode and the front electrode to form a plurality of cells and wherein at least one cell contains a relative or an absolute vacuum.

Example 13 is directed to the display of any preceding example, wherein each cell is biased independently.

Example 14 is directed to the display of any preceding example, wherein at least a pair of the plurality of walls are parallel or non-parallel with each other.

Example 15 is directed to the display of any preceding example, further comprising a color filter layer.

Example 16 is directed to the display of any preceding example, further comprising a directional front light.

Example 17 is directed to a total internal-reflection (TIR) display, comprising: a transparent front sheet having a flat distal surface and a proximal surface with an array of convex protrusions; a front electrode supported by the proximal surface of the transparent front sheet, the front electrode conforming to the array of convex protrusions; a rear electrode facing the front electrode, the rear electrode and the front electrode forming a cavity therebetween; a plurality of walls positioned between the rear electrode and the front electrode in the cavity to form a plurality of cells, each cell defining a sealed cell within the cavity; and a plurality of dry light-absorbing electrostatically mobile particles positioned in each of the plurality of cells, the electrostatically mobile particles configured to move within each cell in response to an electromagnetic bias imposed between the front electrode and the rear electrode.

Example 18 is directed to the display of example 17, wherein each of the plurality of cells includes one of a relative or an absolute vacuum.

Example 19 is directed to the display of examples 17 or 18, wherein each of the plurality of cells further comprises a gaseous medium.

Example 20 is directed to the display of any preceding example, wherein the gaseous medium comprises air having a relative humidity of 60% or less at about 25° C.

Example 21 is directed to the display of any preceding example, wherein the plurality of electrostatically mobile particles includes organic particles or inorganic particles or a combination of organic and inorganic particles and wherein each particle has a diameter in the range of about 0.02-20 µm.

Example 22 is directed to the display of any preceding example, wherein the front and the rear electrode associated with at least one of the plurality of cells is biased independently.

Example 23 is directed to a process to display a total-internal reflection (TIR) image, the process comprising: providing a display structure having a transparent front sheet with a front electrode situated opposite a rear electrode to form a gap between the front electrode and the rear electrode, the gap having a plurality of cells defined by a respective plurality of walls extending from the front electrode to the rear electrode, each cell housing a plurality of dry light-absorbing electrostatically mobile particles; and imposing a first bias to one of the front or the rear electrodes such that the electrostatically mobile particles move within the gap to aggregate substantially adjacent the front electrode in response to the imposed bias; and illuminating the transparent front sheet with a directional front light.

Example 24 is directed to a process to display a total-internal reflection (TIR) image of example 23, wherein each of the plurality of cells includes one of a relative or an absolute vacuum.

Example 25 is directed to a process to display a total-internal reflection (TIR) image of examples 23 or 24, wherein each of the plurality of cells further comprises a gaseous medium.

Example 26 is directed to a process to display a total-internal reflection (TIR) image of any preceding example, wherein the gaseous medium comprises air having a relative humidity of 60% or less at about 25° C.

Example 27 is directed to a process to display a total-internal reflection (TIR) image of any preceding example, wherein the plurality of electrostatically mobile particles includes organic particles or inorganic particles or a combination of organic and inorganic particles and wherein each particle has a diameter in the range of about 0.02-20 µm.

Example 28 is directed to a process to display a total-internal reflection (TIR) image of any preceding example, wherein the front and the rear electrode associated with at least one of the plurality of cells is biased independently.

Example 29 is directed to a process to display a total-internal reflection (TIR) image of any preceding example, further comprising imposing a second bias to one of the front or the rear electrodes such that the electrostatically mobile particles move within the gap to aggregate substantially adjacent the rear electrode in response to the imposed bias.

While the principles of the disclosure have been illustrated in relation to the exemplary embodiments shown herein, the principles of the disclosure are not limited thereto and include any modification, variation or permutation thereof.

What is claimed is:

1. A total internal-reflection (TIR) display, comprising:
   a transparent front sheet having a flat distal surface and a proximal surface with an array of convex protrusions which form a hemispherical-shaped array;
   a front electrode supported by the proximal surface of the transparent front sheet, the front electrode conforming to the hemispherical-shaped array;
   a rear electrode facing the front electrode, the rear electrode and the front electrode forming a sealed cavity therebetween;
   a gaseous medium stored in the sealed cavity; and
   a plurality of dry light-absorbing electrostatically mobile particles positioned in the sealed cavity, the electrostatically mobile particles configured to move within the sealed cavity in response to an electromagnetic bias imposed between the front electrode and the rear electrode.

2. The display of claim 1, wherein the gaseous medium comprises air having a relative humidity of 60% or less at about 25° C.

3. The display of claim 1, wherein the plurality of electrostatically mobile particles includes organic particles or inorganic particles or a combination of organic and inorganic particles and wherein each particle has a diameter in the range of about 0.02-20 μm.

4. The display of claim 1, further comprising a plurality of walls positioned between the rear electrode and the front electrode to form a plurality of cells, wherein each cell contains the gaseous medium.

5. The display of claim 4, wherein each cell is biased independently.

6. The display of claim 4, wherein at least a pair of the plurality of walls are parallel or non-parallel with each other.

7. The display of claim 1, further comprising a color filter layer.

8. The display of claim 1, further comprising a directional front light.

9. A total internal-reflection (TIR) display, comprising:
   a transparent front sheet having a flat distal surface and a proximal surface with an array of convex protrusions;
   a front electrode supported by the proximal surface of the transparent front sheet, the front electrode conforming to the array of convex protrusions;
   a rear electrode facing the front electrode, the rear electrode and the front electrode forming a sealed cavity therebetween;
   a plurality of dry light-absorbing electrostatically mobile particles positioned in the sealed cavity, the electrostatically mobile particles configured to move within the sealed cavity in response to an electromagnetic bias imposed between the front electrode and the rear electrode; and
   wherein the sealed cavity includes vacuum.

10. The display of claim 9, wherein the cavity includes a substantially absolute vacuum.

11. The display of claim 9, wherein the electrostatically mobile particles further comprise inorganic or organic material or a combination of inorganic and organic material and wherein each particle has a diameter in the range of about 0.02-20 μm.

12. The display of claim 9, further comprising a plurality of walls positioned between the rear electrode and the front electrode to form a plurality of cells and wherein at least one cell contains a relative or an absolute vacuum.

13. The display of claim 12, wherein each cell is biased independently.

14. The display of claim 12, wherein at least a pair of the plurality of walls are parallel or non-parallel with each other.

15. The display of claim 9, further comprising a color filter layer.

16. The display of claim 9, further comprising a directional front light.

17. A total internal-reflection (TIR) display, comprising:
   a transparent front sheet having a flat distal surface and a proximal surface with an array of convex protrusions;
   a front electrode supported by the proximal surface of the transparent front sheet, the front electrode conforming to the array of convex protrusions;
   a rear electrode facing the front electrode, the rear electrode and the front electrode forming a cavity therebetween;
   a plurality of walls positioned between the rear electrode and the front electrode in the cavity to form a plurality of cells, each cell defining a sealed cell within the cavity; and
   a plurality of dry light-absorbing electrostatically mobile particles positioned in each of the plurality of cells, the electrostatically mobile particles configured to move within each cell in response to an electromagnetic bias imposed between the front electrode and the rear electrode.

18. The display of claim 17, wherein each of the plurality of cells includes one of a relative or an absolute vacuum.

19. The display of claim 17, wherein each of the plurality of cells further comprises a gaseous medium.

20. The display of claim 19, wherein the gaseous medium comprises air having a relative humidity of 60% or less at about 25° C.

21. The display of claim 17, wherein the plurality of electrostatically mobile particles includes organic particles or inorganic particles or a combination of organic and inorganic particles and wherein each particle has a diameter in the range of about 0.02-20 μm.

22. The display of claim 17, wherein the front and the rear electrode associated with at least one of the plurality of cells is biased independently.

23. A process to display a total-internal reflection (TIR) image, the process comprising:
   providing a display structure having a transparent front sheet with a front electrode situated opposite a rear electrode to form a gap between the front electrode and the rear electrode, the gap having a plurality of cells defined by a respective plurality of walls extending from the front electrode to the rear electrode, each cell housing a plurality of dry light-absorbing electrostatically mobile particles;
   imposing a first bias to one of the front or the rear electrode such that the electrostatically mobile particles move within the gap to aggregate substantially adjacent the front electrode in response to the imposed bias; and
   illuminating the transparent front sheet with a directional front light.

24. The process of claim 23, wherein each of the plurality of cells includes one of a relative or an absolute vacuum.

25. The process of claim 23, wherein each of the plurality of cells further comprises a gaseous medium.

26. The process of claim 25, wherein the gaseous medium comprises air having a relative humidity of 60% or less at about 25° C.

27. The process of claim 23, wherein the plurality of electrostatically mobile particles includes organic particles or inorganic particles or a combination of organic and inorganic particles and wherein each particle has a diameter in the range of about 0.02-20 μm.

28. The process of claim 23, wherein the front and the rear electrode associated with at least one of the plurality of cells is biased independently.

29. The process of claim 23, further comprising imposing a second bias to one of the front or the rear electrode such that the electrostatically mobile particles move within the gap to aggregate substantially adjacent the rear electrode in response to the imposed bias.

\* \* \* \* \*